(12) United States Patent
Oda

(10) Patent No.: US 10,910,813 B2
(45) Date of Patent: Feb. 2, 2021

(54) INTELLIGENT ELECTRONIC DEVICE

(71) Applicant: Mitsubishi Electric Corporation, Tokyo (JP)

(72) Inventor: Shigetoo Oda, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 55 days.

(21) Appl. No.: 16/320,212

(22) PCT Filed: Sep. 1, 2016

(86) PCT No.: PCT/JP2016/075621
§ 371 (c)(1),
(2) Date: Jan. 24, 2019

(87) PCT Pub. No.: WO2018/042587
PCT Pub. Date: Mar. 8, 2018

(65) Prior Publication Data
US 2019/0245337 A1    Aug. 8, 2019

(51) Int. Cl.
*H02H 1/00* (2006.01)
*H02H 3/093* (2006.01)
(Continued)

(52) U.S. Cl.
CPC .......... *H02H 1/0007* (2013.01); *G05B 15/02* (2013.01); *H02H 1/0092* (2013.01);
(Continued)

(58) Field of Classification Search
CPC .. H02H 1/0007; H02H 1/0092; H02H 3/0935; H04B 3/00; H04B 3/02;
(Continued)

(56) References Cited

U.S. PATENT DOCUMENTS 6,396,421 B1 * 5/2002 Bland ................. G10L 19/0204
341/123
6,747,858 B1 * 6/2004 Sculley ............. H03H 17/0621
361/61
(Continued)

FOREIGN PATENT DOCUMENTS

JP    4275696 B2    6/2009
JP    2015089182 A    5/2015
JP    2015231270 A    12/2015

OTHER PUBLICATIONS

International Search Report (PCT/ISA/210) dated Nov. 22, 2016, by the Japan Patent Office as the International Searching Authority for International Application No. PCT/JP2016/075621.
(Continued)

*Primary Examiner* — Young T. Tse
(74) *Attorney, Agent, or Firm* — Buchanan Ingersoll & Rooney PC

(57) ABSTRACT

In an intelligent electronic device, a first receiving circuit receives first time-series data at a first sample rate representing the electrical quantity of an electric power system from a merging unit. An up converter converts the first time-series data into second time-series data having a second sample rate higher than the first sample rate by interpolating the first time-series data. A down converter converts the second time-series data into third time-series data having a third sample rate lower than the first sample rate by periodically extracting a data point at any changeable sample time from the second time-series data. A relay computer performs protective relay computation using third time-series data.

14 Claims, 19 Drawing Sheets

(51) Int. Cl.
*H04B 3/46* (2015.01)
*H04B 17/20* (2015.01)
*G05B 15/02* (2006.01)

(52) U.S. Cl.
CPC ............ *H02H 3/0935* (2013.01); *H04B 3/46* (2013.01); *H04B 17/20* (2015.01)

(58) Field of Classification Search
CPC . H04B 3/46; H04B 3/56; H04B 17/00; H04B 17/20; H04B 17/24; G05B 15/02

USPC ....... 375/219, 220, 224, 225, 257, 354–356; 370/282, 284

See application file for complete search history.

(56) References Cited

U.S. PATENT DOCUMENTS

| | | | |
|---|---|---|---|
| 8,619,840 B2* | 12/2013 | Ji | H03H 17/0642 |
| | | | 341/118 |
| 2003/0184368 A1* | 10/2003 | Li | H03D 3/006 |
| | | | 329/300 |
| 2008/0112102 A1 | 5/2008 | Oda | |
| 2013/0212142 A1* | 8/2013 | Martinez Heras | G06F 17/17 |
| | | | 708/290 |
| 2015/0171621 A1* | 6/2015 | Oda | H02H 7/263 |
| | | | 361/64 |
| 2015/0316593 A1* | 11/2015 | Oda | G01R 19/2513 |
| | | | 702/60 |

OTHER PUBLICATIONS

International Standard, Instrument transformers—Part 9: Digital Interface for instrument transformers, IEC 61869-9, Edition 1.0 Apr. 2016, 64 pages.

* cited by examiner

| FREQUENCY (Hz) / ELECTRICAL ANGLE(°) | -2.0% 49.0/58.8 | | -1.0% 49.5/59.4 | | -0.2% 49.9/59.98 | | 0.0% 50.0/60.0 | +0.2% 50.1/60.12 | | +1.0% 50.5/60.6 | | +2.0% 51.0/61.2 | |
|---|---|---|---|---|---|---|---|---|---|---|---|---|---|
| 30 | 41 | +1 | 40 | +0 | 40 | +0 | 40 | 40 | -0 | 40 | -0 | 39 | -1 |
| 60 | 82 | +2 | 81 | +1 | 80 | +0 | 80 | 80 | -0 | 79 | -1 | 78 | -2 |
| 90 | 122 | +2 | 121 | +1 | 120 | +0 | 120 | 120 | -0 | 119 | -1 | 118 | -2 |
| 120 | 163 | +3 | 162 | +2 | 160 | +0 | 160 | 160 | -0 | 158 | -2 | 157 | -3 |
| 150 | 204 | +4 | 202 | +2 | 200 | +0 | 200 | 200 | -0 | 198 | -2 | 196 | -4 |
| 180 | 245 | +5 | 242 | +2 | 241 | +1 | 240 | 240 | | 238 | -2 | 235 | -5 |
| . | | | | | | | | | | | | | |
| . | | | | | | | | | | | | | |
| 300 | 408 | +8 | 404 | +4 | 401 | +1 | 400 | 399 | -1 | 396 | -4 | 392 | -8 |
| 330 | 449 | +9 | 444 | +4 | 441 | +1 | 440 | 439 | -1 | 436 | -4 | 431 | -9 |
| 360(1 CYCLE) | 490 | +10 | 485 | +5 | 481 | +1 | 480 | 479 | -1 | 475 | -5 | 471 | -9 |
| . | | | | | | | | | | | | | |
| 720(2 CYCLES) | 980 | +20 | 970 | +10 | 962 | +2 | 960 | 958 | -2 | 950 | -10 | 941 | -19 |
| 1080(3 CYCLES) | 1469 | +29 | 1455 | +15 | 1443 | +3 | 1440 | 1437 | -3 | 1426 | -14 | 1412 | -28 |
| 1440(4 CYCLES) | 1959 | +39 | 1939 | +19 | 1924 | +4 | 1920 | 1916 | -4 | 1901 | -19 | 1882 | -38 |
| . | | | | | | | | | | | | | |
| 3600(10 CYCLES) | 4898 | +98 | 4849 | +49 | 4810 | +10 | 4800 | 4790 | -10 | 4753 | -47 | 4706 | -94 |

FIG.6

WHEN FREQUENCY IS
50.0 Hz (RATED)

DT1 DATA          DT2 DATA

WHEN FREQUENCY IS 49.0 Hz

DT1 DATA          DT2 DATA

| FREQUENCY (Hz) / ELECTRICAL ANGLE(°) | -0.9375% 49.53/59.44 | | -0.6250% 49.69/59.63 | | -0.3125% 49.84/59.81 | | 0.0% 50.0/60.0 | +0.3125% 50.16/60.19 | | +0.6250% 50.31/60.38 | | +0.9375% 50.47/60.56 | |
|---|---|---|---|---|---|---|---|---|---|---|---|---|---|
| 30 | 323 | +3 | 322 | +2 | 321 | +1 | 320 | 319 | -1 | 318 | -2 | 317 | -3 |
| 60 | 646 | +6 | 644 | +4 | 642 | +2 | 640 | 638 | -2 | 636 | -4 | 634 | -6 |
| 90 | 969 | +9 | 966 | +6 | 963 | +3 | 960 | 963 | -3 | 964 | -6 | 961 | -9 |
| 120 | 1292 | +12 | 1288 | +8 | 1284 | +4 | 1280 | 1276 | -4 | 1272 | -8 | 1268 | -12 |
| 150 | 1615 | +15 | 1610 | +10 | 1605 | +5 | 1600 | 1595 | -5 | 1590 | -10 | 1585 | -15 |
| 180 | 1938 | +18 | 1932 | +12 | 1926 | +6 | 1920 | 1914 | -6 | 1908 | -12 | 1902 | -18 |
| ･ | | | | | | | | | | | | | |
| 300 | 3230 | +30 | 3220 | +20 | 3210 | +10 | 3200 | 3190 | -10 | 3180 | -20 | 3170 | -30 |
| 330 | 3553 | +33 | 3542 | +22 | 3531 | +11 | 3520 | 3509 | -11 | 3498 | -22 | 3487 | -33 |
| 360 (1 CYCLE) | 3876 | +36 | 3864 | +24 | 3852 | +12 | 3840 | 3828 | -12 | 3816 | -24 | 3804 | -36 |
| ･ | | | | | | | | | | | | | |
| 720 (2 CYCLES) | 7672 | +72 | 7648 | +48 | 7624 | +24 | 7600 | 7574 | -24 | 7552 | -48 | 7528 | -72 |
| ･ | | | | | | | | | | | | | |
| 1080 (3 CYCLES) | 11628 | +108 | 11592 | +72 | 11556 | +36 | 11520 | 11484 | -36 | 11448 | -72 | 11402 | -108 |
| ･ | | | | | | | | | | | | | |
| 1440 (4 CYCLES) | 15504 | +144 | 15456 | +96 | 15408 | +48 | 15360 | 15312 | -48 | 15264 | -96 | 15214 | -144 |
| ･ | | | | | | | | | | | | | |
| 3600 (10 CYCLES) | 38760 | +360 | 38640 | +240 | 38520 | +120 | 38400 | 38280 | -120 | 38160 | -240 | 38040 | -360 |

WHEN FREQUENCY IS 50.0 Hz (RATED)

DT1 DATA

| I(t) |
| I(t−1) |
| I(t−2) |
| . |
| . |
| I(t−40) |
| . |
| . |
| I(t−240) |
| . |
| . |
| I(t−480) |
| . |
| . |
| I(t−1920) |

DT3 DATA

| COUNTER VALUE m |
|---|
| I(t−m) |
| I(t−(m+480)) |
| I(t−(m+960)) |
| I(t−(m+1440)) |
| I(t−(m+1920)) |

DT2 DATA

| I(t) |
| I(t−40) |
| I(t−80) |
| I(t−120) |
| I(t−160) |
| I(t−200) |
| I(t−240) |
| . |
| . |
| I(t−480) |
| . |
| . |
| I(t−1920) |

| COUNTER VALUE m |
|---|
| I(t−m) |
| I(t−(m+480)) |
| I(t−(m+480+40)) |
| I(t−(m+480+80)) |
| I(t−(m+480+120)) |
| . |
| . |
| I(t−(m+960)) |
| . |
| . |
| I(t−(m+1920)) |

FIG. 14B

WHEN FREQUENCY IS 49.0 Hz

DT1 DATA

| I(t) |
| I(t−1) |
| I(t−2) |
| . |
| . |
| I(t−40) |
| . |
| . |
| I(t−240) |
| . |
| . |
| I(t−480) |
| . |
| . |
| I(t−1920) |

DT3 DATA

| COUNTER VALUE m |
|---|
| I(t−m) |
| I(t−(m+480)) |
| I(t−(m+960)) |
| I(t−(m+1440)) |
| I(t−(m+1920)) |

DT2 DATA

| I(t) |
| I(t−41) |
| I(t−82) |
| I(t−122) |
| I(t−163) |
| I(t−204) |
| I(t−245) |
| . |
| . |
| I(t−490) |
| . |
| . |
| I(t−1918) |

| COUNTER VALUE m |
|---|
| I(t−m) |
| I(t−(m+490)) |
| I(t−(m+490+41)) |
| I(t−(m+490+82)) |
| I(t−(m+490+122)) |
| . |
| . |
| I(t−(m+980)) |
| . |
| . |
| I(t−(m+1918)) |

INTELLIGENT ELECTRONIC DEVICE

TECHNICAL FIELD

The present disclosure relates to an intelligent electronic device that receives a signal from a merging unit collecting information of current and voltage of an electric power system and performs protective relay computation based on the received signal.

BACKGROUND ART

A process bus-applied protective system has become common, in which a conventional protective relay is divided into a merging unit (MU) and an intelligent electronic device (IED), which are connected through a process bus (for example, see Japanese Patent Laying-Open No. 2015-089182 (PTL 1)). In such a protective system, the MU is installed near a power device in, for example, an electric power substation, and the MU captures a signal (current signal and voltage signal) of the electrical quantity (current and voltage) of the electric power system. The MU converts the captured electrical quantity signal from analog to digital (A/D) and transmits the digital signal after A/D conversion in the form of serial data to the IED through the process bus.

For the sample rate (also referred to as sampling frequency) at which the MU captures the electrical quantity of the electric power system for protection control, the international standards for digital interface for instrument transformers (IEC61869-9, Edition 1.0, 2016-04 (NPL 1)) define 4800 Hz as a recommended value. This sample rate is the same whether the system frequency is 50 Hz or 60 Hz and does not depend on variation of the system frequency.

The IED receives data of the electrical quantity sampled at 4800 Hz from the MU through the process bus and performs protective relay computation based on the received data. For a sampling period of data used for protective relay computation (in this description, referred to as "relay computation period" or "computation period" and its reciprocal is referred to as relay computation frequency), 15°, 22.5°, 30°, etc. are used, using the electrical angle of the electrical quantity (having system frequency) of the electric power system as a unit.

CITATION LIST

Patent Literature

PTL 1: Japanese Patent Laying-Open No. 2015-089182
PTL 2: Japanese Patent Laying-Open No. 2015-231270
PTL 3: Japanese Patent No. 4275696

Non Patent Literature

NPL 1: International Standard, IEC61869-9, Edition 1.0, 2016-04, Instrument transformers—Part 9: Digital interface for instrument transformers SUMMARY OF INVENTION

Technical Problem

The sample rate in signal capturing in the MU is fixed to, for example, 4800 Hz, causing a problem below. In the following, it is assumed that the system frequency f is equal to the rated frequency Fn.

When the system frequency f is 50 Hz, the sample rate of 4800 Hz corresponds to 96 f. For example, in order to perform protective relay computation every electrical angle 30° (relay computation frequency=12 f), protective relay computation is performed once in eight periods in sampling period during data capturing in the MU to achieve a relay computation frequency of 12 f.

On the other hand, when the system frequency f is 60 Hz, the sample rate of 4800 Hz corresponds to 80 f. Therefore, although it is intended to perform protective relay computation every electrical angle 30° (relay computation frequency=12 f), the sample rate (80 f) during data capturing in the MU is not an integer multiple of the relay computation frequency (12 f). It is therefore difficult to achieve the relay computation period of electrical angle 30°. Then, when the system frequency is 60 Hz, the relay computation period is set to the electrical angle 22.5° (relay computation frequency=16f) to perform protective relay computation once in five periods in sampling period.

However, if the relay computation period changes with the rated frequency, the electrical angles of data used for computation differs, which naturally requires the computation algorithm to be changed. Then, changing the computation algorithm according to the rated frequency of the electric power system takes extra costs for developing protective relays.

The fundamental cause of such a problem lies in that it is difficult to control sampling at a timing suitable for protective computation because A/D conversion is executed not by the IED that performs protective computation but by the MU and, moreover, the sampling frequency is defined. One of possible measures for this is to perform digital to analog conversion (D/A) of digital data received from the MU into an analog signal again in the IED. This enables A/D conversion at a necessary timing in the IED. This method, however, requires addition of a D/A conversion circuit, an analog circuit, and an A/D conversion circuit in the IED and has a cost disadvantage.

The present disclosure is made in view of the problem above. A main object of the present disclosure is to configure an intelligent electronic device such that the sample timing of the relay computation period can be controlled as desired even when the sample timing of current data and/or voltage data received from the merging unit is determined in the merging unit. Other problems and new configurations of this disclosure will become apparent from the following detailed description and the drawings.

Solution to Problem

The present disclosure provides an intelligent electronic device including a communication circuit, an up converter, a down converter, and a relay computer. The communication circuit receives first time-series data at a first sample rate representing electrical quantity of an electric power system from a merging unit. The up converter converts the first time-series data into second time-series data having a second sample rate higher than the first sample rate by interpolating the first time-series data. The down converter converts the second time-series data into third time-series data having a third sample rate lower than the first sample rate by periodically extracting a data point at any changeable sample time from the second time-series data. The relay computer performs protective relay computation using the third time-series data.

Advantageous Effects of Invention

According to the present disclosure, the intelligent electronic device converts digital data received from the merging unit into digital data at a high sample rate, rather than converting it into analog data. This digital data at a high sample rate is down-converted into digital data having a desired sample rate, so that the sample timing of the relay computation period can be controlled as desired even when the sample timing of current data and/or voltage data received from the merging unit is determined in the merging unit.

BRIEF DESCRIPTION OF DRAWINGS

FIG. 6 is a diagram showing an exemplary table for determining the number of data points corresponding to a relay computation period in step S140 in FIG. 4.

FIGS. 7A and 7B are diagrams for explaining an example of performing a down-conversion process using the table shown in FIG. 6.

FIG. 8 is a diagram showing another example of the table for determining the number of data points in step S140 in FIG. 4.

FIGS. 14A and 14B are illustrations of data stored in a plurality of data storages in FIG. 11.

DESCRIPTION OF EMBODIMENTS

Figure 1:
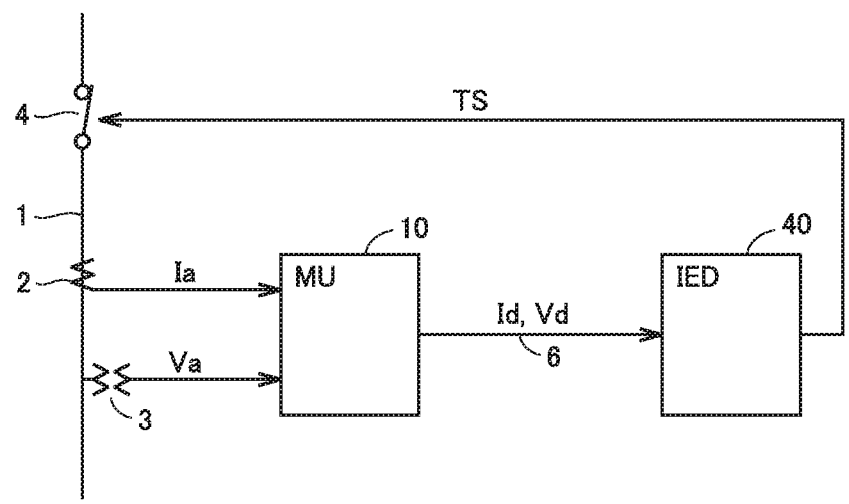
FIG. 1 is a diagram showing the arrangement of a MU and an IED in an electric power system.

Embodiments of the present invention will be described in detail below with reference to the drawings. The same or corresponding parts are denoted by the same reference signs and a description thereof will not be repeated.

DESCRIPTION OF TERMS

The meaning of the specific terms used in the present description is described below.

(1) System Frequency

The frequency at present of an electric power system is referred to as system frequency. The system frequency may differ from the rated frequency (50 Hz or 60 Hz) of the electric power system. In this description, the system frequency is denoted by f and the rated frequency is denoted by Fn.

(2) Electrical Quantity

At least one of current or voltage of the electric power system is referred to as electrical quantity.

(3) Sampling Period, Sampling Frequency (Sample Rate)

The time interval between temporally adjacent data points of time-series data is referred to as sampling period [unit: second]. The reciprocal of the sampling period is referred to as sampling frequency (or sample rate) [unit: Hz].

(4) Relay Computation Period, Relay Computation Frequency

The relay computation period (simply referred to as computation period) refers to the sampling period of time-series data of the electrical quantity for use in protective relay computation (also referred to as protective computation). Typically, the relay computation period is represented in units of electrical angles of electrical quantity of the electric power system, and 15°, 22.5°, 30° are used. The reciprocal of the relay computation period [unit: second] is referred to as relay computation frequency (simply referred to as computation frequency). For protective relay computation free from errors, the relay computation period preferably corresponds to the frequency at present of the electric power system (system frequency f).

First Embodiment

Problem to be Solved by First Embodiment

The main problem to be solved by the first embodiment is to provide an intelligent electronic device capable of using the same protection computation algorithm irrespective of the difference in system frequency even when the sample rate of current data and voltage data received from the merging unit is not an integer multiple of the relay computation frequency as described above.

In the first embodiment, in addition to the problem above, a method of reducing a protective relay computation error that may occur when the system frequency varies from the rated frequency is described.

Since the relay computation period is determined based on the sampling period in the MU for the sake of convenience, protective relay computation is performed on the premise that the system frequency is equal to the rated frequency (50 Hz or 60 Hz). Therefore, deviation of the system frequency f from the rated frequency Fn causes an error in the computation result.

In order to suppress this computation error, for example, in the case of a conventional protective relay having an analog-to-digital converter (that is, the case where the MU and the IED are not separated), the sample rate of the A/D converter can be adjusted in accordance with the detected frequency of the electric power system. However, when the sample rate in the MU is fixed by the standards, it is impossible to use this method.

Meanwhile, Japanese Patent Laying-Open No. 2015-231270 (PTL 2) discloses a method of correcting an error due to frequency variation by computation, rather than detecting the frequency at present. Specifically, the IED in this literature executes correction computation using data preceding by a sampling period corresponding to 180° at the rated frequency. This method is applicable to the system in which the protective relay is divided into MU and IED. However, the correction method by such computation increases necessary computation processes and increases the processing time in the CPU, resulting in cost increase of the protective relay. Therefore, there is a demand for a simpler method for correcting a protective computation error resulting from variation in system frequency.

Arrangement of MU and IED in Electric Power System

FIG. 1 is a diagram showing the arrangement of the MU and the IED in an electric power system. Referring to FIG. 1, a current transformer 2 (CT), a voltage transformer 3 (VT), and a breaker 4 are provided on a three-phase line 1 representing a power transmission line or a bus. Current transformer 2 converts current flowing through three-phase line 1 into current at a magnitude suitable for input to MU 10. The current converted by current transformer 2 is input to MU 10. Similarly, voltage transformer 3 converts a voltage on three-phase line 1 into a voltage at a magnitude suitable for input to MU 10. The voltage converted by voltage transformer 3 is input to MU 10.

MU (merging unit) 10 collects information necessary for protection and control of the electric power system, such as a current signal and a voltage signal output from current transformer 2 and voltage transformer 3, respectively. MU 10 converts the acquired current signal and voltage signal from analog to digital (A/D) at a certain sampling period (for example, 4800 Hz) defined by the standards for process bus. MU 10 outputs the digital data obtained through A/D conversion to IED 40 through a communication line 6 called process bus in accordance with a predetermined protocol.

IED (intelligent electronic device) 40 performs protective computation (also referred to as relay computation) based on data received from MU 10 through communication line 6. The sampling period of data used for protective computation (as previously mentioned, referred to as "relay computation period" or "computation period" in order to be distinguished from the sampling period in data acquisition in the MU) is, for example, 300 in the case of the system frequency. As a result of protective computation, if it is determined that the electric power system has a failure, IED 40 outputs a trip signal TS to breaker 4.

In the foregoing, an output circuit of trip signal TS may be provided in MU 10. In this case, IED 40 transmits a command signal for allowing the output circuit of the trip signal to operate to MU 10, and in turn MU 10 outputs a trip signal from the output circuit in accordance with the command signal.

Hardware Configuration Example of MU and IED

Figure 2:
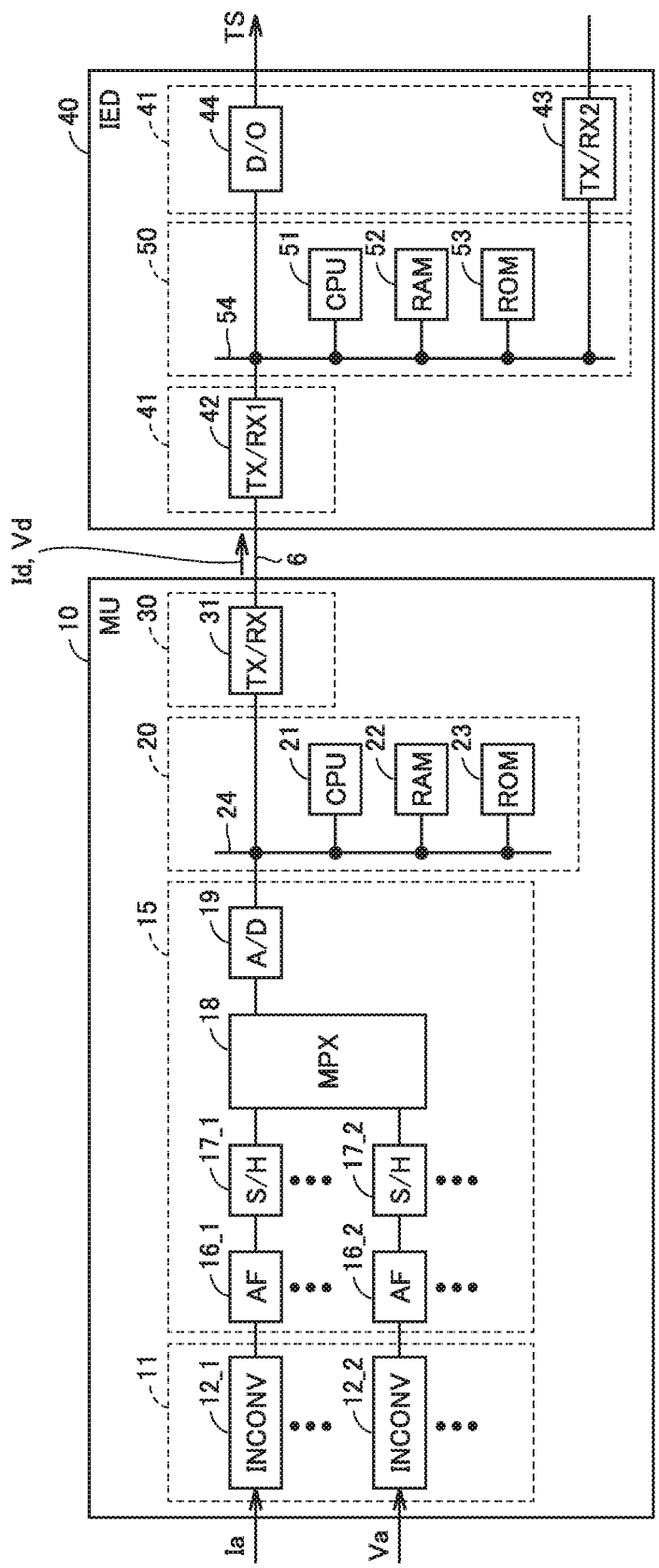
FIG. 2 is a block diagram showing an exemplary hardware configuration of the MU and the IED.

FIG. 2 is a block diagram showing an exemplary hardware configuration of the MU and the IED. Referring to FIG. 2, MU 10 includes an input conversion unit 11, an A/D conversion unit 15, a computation processor 20, and an interface 30.

Input conversion unit 11 is an input unit receiving a current signal of each phase output from current transformer 2 in FIG. 1 and a voltage signal of each phase output from voltage transformer 3 in FIG. 1. Input conversion unit 11 includes a transformer for each channel as an input converter 12 (12_1, 12_2, . . . ) (INCONV). Each channel receives a current signal of the corresponding phase and a voltage signal of the corresponding phase (FIG. 2 shows only two channels by way of illustration). Each input converter 12 converts the current signal or the voltage signal from current transformer 2 or voltage transformer 3 to signals at a voltage level suitable for signal processing in A/D conversion unit 15 and computation processor 20.

A/D conversion unit 15 includes analog filters 16 (AF), sample and hold circuits 17 (S/H), a multiplexer 18 (MPX), and an analog/digital (A/D) converter 19. Analog filters 16 (16_1, 16_2, . . . ) and sample and hold circuits 17 (17_1, 17_2, . . . ) are provided corresponding to a plurality of input converters 12 (12_1, 12_2, . . . ) for respective channels.

Each analog filter 16 is a filter provided for removing a folding error in A/D conversion. Each sample and hold circuit 17 samples a signal passing through the corresponding analog filter 16 at a predetermined sample rate (also referred to as sampling frequency) (for example, 4800 Hz) and holds the signal. Multiplexer 18 successively selects the voltage signals held in sample and hold circuits 17. A/D converter 19 converts the signal selected by the multiplexer into a digital value.

Computation processor 20 includes a CPU 21 (Central Processing Unit), a RAM 22 (Random Access Memory), and a ROM 23 (Read Only Memory). These components are connected to each other through a bus 24. Computation processor 20 may include an electrically rewritable nonvolatile memory (not shown) such as a flash memory. RAM 22 and ROM 23 are used as main memory for CPU 21. CPU 21 controls the entire operation of MU 10 under instructions of a program stored in ROM 23 and the nonvolatile memory.

Interface 30 includes a communication circuit 31 (TX/RX) for transmitting data to IED 40 through communication line 6 (process bus).

IED 40 includes an interface 41 and a computation processor 50. Interface 41 includes a communication circuit 42 (TX/RX1), a transmitting/receiving circuit 43 (TX/RX2), and a digital output circuit 44 (D/O).

Communication circuit 42 (TX/RX1) receives data output from communication circuit 31 (TX/RX) of MU 10 and transmitted through communication line 6 (process bus). Transmitting/receiving circuit 43 (TX/RX2) performs communication in accordance with a predetermined protocol with a higher-level computer (not shown) through a communication line (not shown) called a station bus. Digital output circuit 44 (D/O) is an interface circuit for outputting a signal to an external device. For example, digital output circuit 44 outputs trip signal TS to breaker 4 in FIG. 1 in accordance with a command from CPU 21. Trip signal TS may be output from communication circuit 42 to communication line 6, received by communication circuit 31, and output to breaker 4 via MU 10.

Computation processor 50 includes a CPU 51, a RAM 52, and a ROM 53. These components are connected to each other through a bus 54. Computation processor 50 may include an electrically rewritable nonvolatile memory (not shown) such as flash memory. RAM 52 and ROM 53 are used as main storage for CPU 51. CPU 51 operates under instructions of a program enabled in ROM 53 and the nonvolatile memory. The operation of computation processor 50 in IED 40 is described in detail below.

Configuration and Operation Overview of ED

Figure 3:
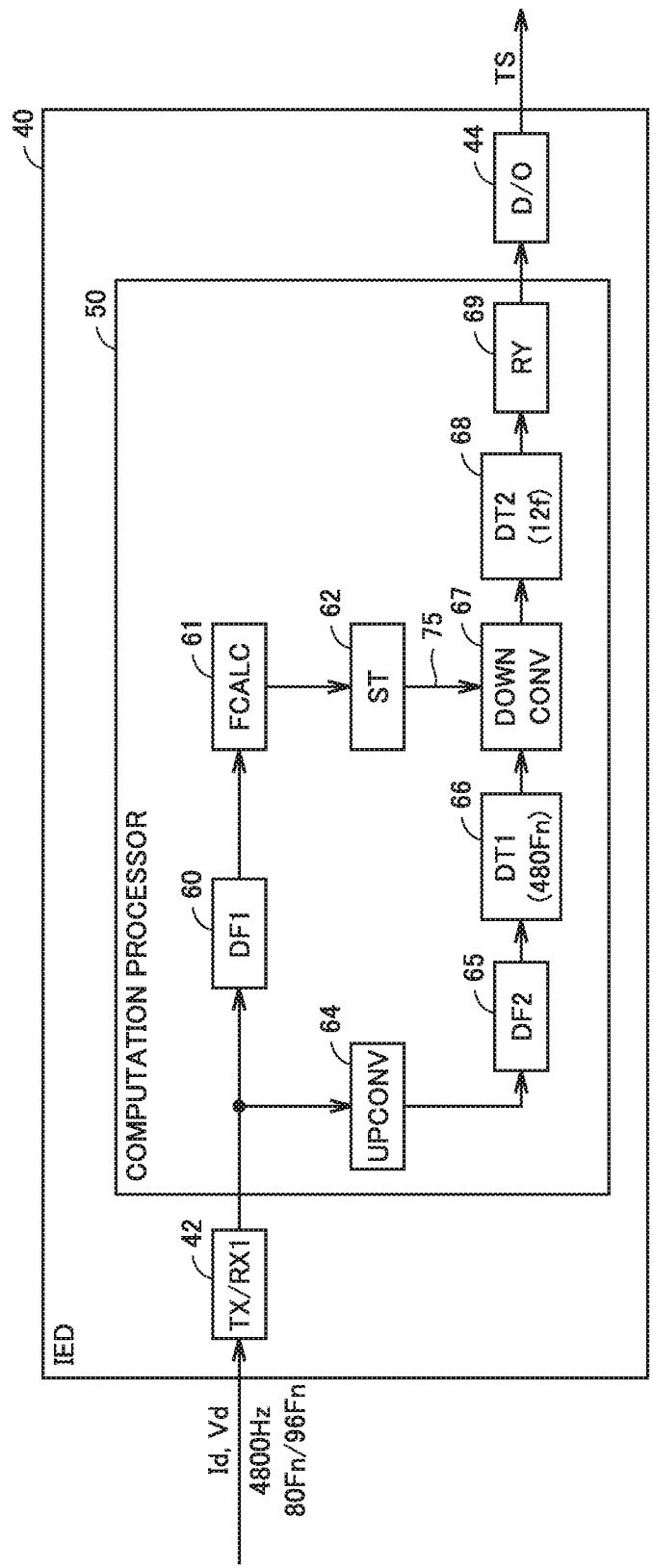
FIG. 3 is a functional block diagram of the IED in a first embodiment.

FIG. 3 is a functional block diagram of the IED in the first embodiment. Referring to FIG. 3, computation processor 50 of IED 40 functions as a digital filter processor 60 (DF1), a frequency computer 61 (FCALC), a sample timing controller 62 (ST), an up converter 64 (UPCONV), a digital filter processor 65 (DF2), a data storage 66 (DT1), a down converter 67 (DOWNCONV), a data storage 68 (DT2), and a relay computer 69 (RY). The functions above are implemented by CPU 51 operating under instructions of a program. The operation overview of each functional unit is described below.

The sampling data of current signal Id and voltage signal Vd transmitted from MU 10 in FIG. 1 through process bus 6 is received by communication circuit 42 (TX/RX1) of IED 40. The sample rate of this received data is, for example, 4800 Hz.

Digital filter processor 60 (DF1) removes a harmonic distortion included in time-series data (current signal Id and voltage signal Vd) received by communication circuit 42 (TX/RX1). Frequency computer 61 (FCALC) computes the frequency of the time-series data from which a harmonic distortion has been removed. Sample timing controller 62 (ST) determines the number of sampling data points (the number of data points after up conversion described below) corresponding to an integer multiple of the relay computation period (for example, 30° in electrical angle), based on the frequency computation result of frequency computer 61 (FCALC). Sample timing controller 62 (ST) outputs a control signal 75 representing the determined number of sampling data points to down converter 67 (DOWNCONV). The timing for down converter 67 (DOWNCONV) to extract a sample value from data storage 66 (DT1) is thus controlled in the down-conversion process described later. That is, down converter 67 (DOWNCONV) can periodically extract a data point at any changeable sampling time from data storage 66 (DT1).

Concurrently with the processing above, up converter 64 (UPCONV) converts (up-converts) the sample rate of the received data by communication circuit 42 (TX/RX1) into a higher sample rate. Digital filter processor 65 (DF2) removes a high-frequency component included in the time-series data converted in a high sample rate. This high-frequency cut-off filter provides attenuation necessary for a harmonic region exceeding a frequency of ½ of the relay computation frequency. Data storage 66 (DT1) stores the time-series data filtered by digital filter processor 65 (DF2) for the amount of time necessary for relay computation from the present point of time.

Down converter 67 (DOWNCONV) extracts data from data storage 66 (DT1) every number of data points corresponding to the relay computation period determined by sample timing controller 62 (ST). That is, the sample rate of the received data is frequency-converted (down-converted) into a lower sample rate (relay computation frequency). Data storage 68 (DT2) stores sampling data for each relay computation period extracted by down converter 67 (DOWNCONV).

Relay computer 69 (RY) performs relay computation using the data stored in data storage 68 (DT2). As a result of the relay computation, if it is determined that a failure occurs in the electric power system, relay computer 69 (RY) outputs a trip signal via digital output circuit 44 (D/O).

Detail Operation of IED

Figure 4:
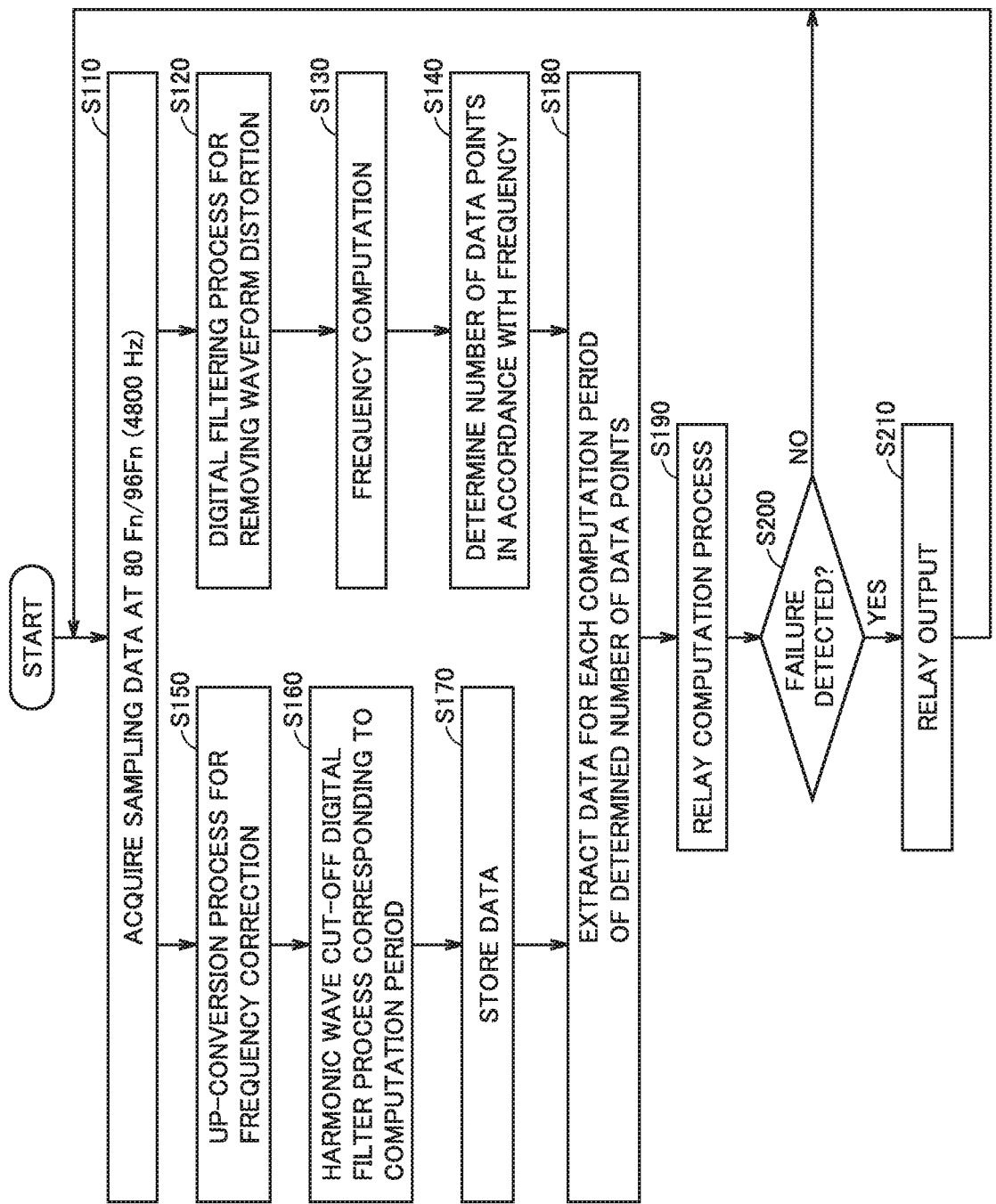
FIG. 4 is a flowchart showing the operation of the IED in FIG. 3.

FIG. 4 is a flowchart showing the operation of the IED in FIG. 3. The operation of IED 40 is described in more detail below mainly referring to FIG. 3 and FIG. 4.

First of all, in step S110 in FIG. 4, communication circuit 42 (TX/RX1) receives current data and voltage data sampled by the MU. The received sampling data is captured by computation processor 50. The sample frequency of current data and voltage data is, for example, 4800 Hz. When the rated frequency Fn is 50 Hz, 4800 Hz corresponds to 96 Fn. When the rated frequency Fn is 60 Hz, 4800 Hz corresponds to 80 Fn.

In the next step S120, digital filter processor 60 (DF1) performs a digital filtering process for removing a waveform distortion resulting from a harmonic wave. For example, moving average processing (averaging of several sample values) is performed as the digital filtering process. Since the frequency computation performed in the next step S130 is premised on that the input signal typically has an AC waveform, the frequency is unable to be calculated correctly if the input signal includes a harmonic component. This is the reason why an unnecessary harmonic component is removed by the digital filtering process. In the case of a frequency computation algorithm capable of computing the frequency even in the presence of a waveform distortion, the process in step S120 is unnecessary.

In the next step S130, frequency computer 61 (FCALC) computes the frequency of the input current signal or the input voltage signal after the digital filtering process. This frequency computation can be performed using any known methods.

For example, the system frequency can be calculated from the interval between adjacent zero-cross points, based on the zero-cross point where the polarity of current data or voltage data changes. The zero-cross point can be obtained by interpolating between sample points before and after the zero-cross point by linear approximation.

As another example, as described in Japanese Patent No. 4275696 (PTL 3), the system frequency can be calculated based on the ratio between the amplitude value of the AC electrical quantity and the amplitude value of difference of the electrical quantity. For example, the electrical angle corresponding to a predetermined period T at the rated frequency Fn is denoted as θn (for example, electrical angle 30°), and the electrical angle corresponding to a predetermined period T at the system frequency f is denoted as θ. The electrical quantity at present time t is denoted as V(t), and the difference between electrical quantity V(t−2T), 2T before present time t, and electrical quantity V(t) at present time t is written as dV(t)=V(t)−V(t−2T). Here, the square of amplitude value |V(t)| of electrical quantity V(t) and the square of amplitude value |dV(t)| of difference dV(t) are written as:

$$|V(t)|^2 = [V(t-3T)\cdot V(t-3T) - V(t)\cdot V(t-6T)]/(\sin 3T)^2 \quad (1)$$

$$|dV(t)|^2 = [dV(t-3T)\cdot dV(t-3T) - dV(t)\cdot dV(t-6T)]/(\sin 3T)^2 \quad (2).$$

When A=|dV(t)|/|V(t)| (note that sin(3T) is cancelled out and need not be calculated), electrical angle θ is written as:

$$\theta = \sin^{-1}(A/2) \quad (3).$$

Therefore, system frequency f can be calculated according to $$f = fn \cdot \theta/\theta n \quad (4).$$

In the next step S140, sample timing controller 62 (ST) determines the number of sampling data points corresponding to an integer multiple of the relay computation period based on the calculated system frequency at the present time (it is noted that this number of data points is for the data point row after up-conversion). Specifically, as shown in FIG. 6, a table is stored in advance in, for example, ROM 53 or a nonvolatile memory (not shown) to indicate the correspondence between the electrical angle (corresponding to an integer multiple of the relay computation period) and the number of data points, for each system frequency. Sample timing controller 62 (ST) determines the number of data points corresponding to an integer multiple of the relay computation period, based on this table. The details of the table in FIG. 6 will be described later.

Concurrently with steps S120, S130, S140 above, steps S150, S160, S170 are executed. First of all, in step S150 in FIG. 4, up converter 64 (UPCONV) performs an up-conversion process of changing to a higher sample rate using the data received in step S110. The sample rate after up conversion is determined as follows.

The sample rate of the input signal, 4800 Hz, is 96 Fn when the rated frequency Fn is 50 Hz, and it is 80 Fn when the rated frequency Fn is 60 Hz. Assuming that relay computation is performed every electrical angle 30° (relay computation period=electrical angle 30°), the relay computation frequency is 12 f. Assuming that the rated frequency Fn is equal to the system frequency f (Fn=f), the least common multiple of 96 Fn, 80 Fn, and 12 f is 480 Fn. The sample rate of data after up conversion is set to an integer multiple of the least common multiple 480 Fn. By setting the sample rate in this manner, data in the relay computation period can be easily extracted by performing a down-conversion process later in step S180. For example, when the sample rate of data after up conversion is 480 Fn (one time the least common multiple 480 Fn), data is extracted every 40 samples (that is, a decimation process is performed to decimate 39 samples therein) to result in sampling data with the relay computation frequency 12 f.

More generally, the first rated frequency is denoted as Fn1 [Hz] and the second rated frequency is denoted as Fn2 [Hz] (Fn1 and Fn2 are integers). The sample rate of data received from the MU is P·Fn1=R·Fn2 (P and R are integers). In this case, if the system frequency f is equal to the rated frequency Fn1 or Fn2, the sample rate of data after up conversion is equal to an integer multiple of the least common multiple of P, Q, and the relay computation frequency.

In the foregoing, the IED can be used in both of the electric power system with the rated frequency Fn of 50 Hz and the electric power system with the rated frequency Fn of 60 Hz. By contrast, for example, when the IED is used only in the electric power system with the rated frequency of 60 Hz, the sample rate of data after up conversion is set to a multiple of 240 f that is the least common multiple of 80 f and 12 f. For example, when the sample rate of data after up conversion is 240 f (one time the least common multiple 240 f), the sampling data at the relay computation frequency 12 f can be easily obtained by extracting data points every 20 samples (that is, the decimation process of removing 19 samples therein is performed).

Specifically, the up-conversion process can be performed by interpolating between adjacent data points. For example, a variety of known methods such as linear interpolation, polynominal interpolation, and trigonometric interpolation can be used. In the following, a method of performing linear interpolation using moving average processing will be illustrated by way of example as a method with a small amount of computation and relatively low burden on the CPU.

Figure 5:
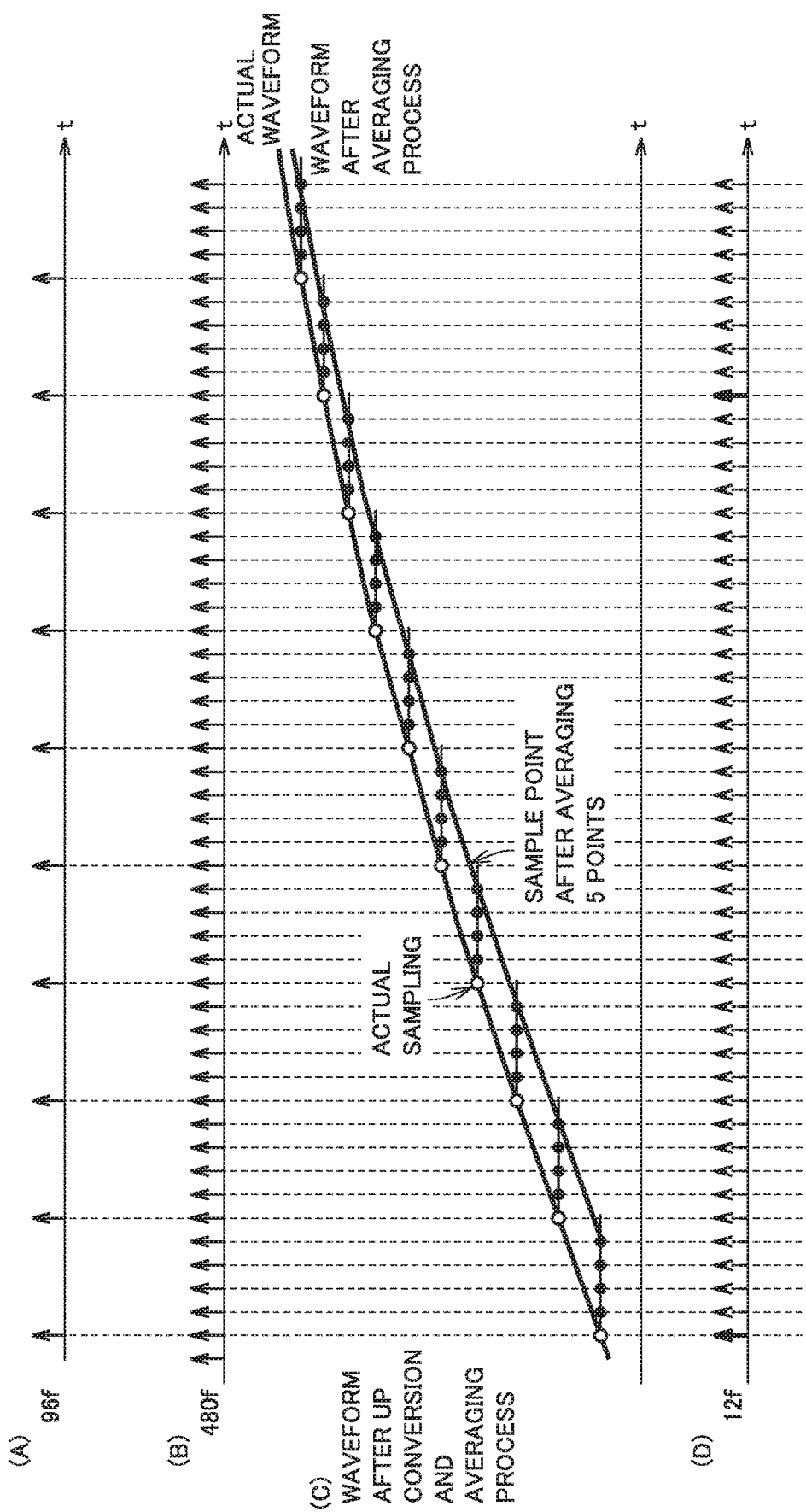
FIG. 5 is a timing chart for explaining an up-conversion process using moving average.

FIG. 5 is a timing chart for explaining the up-conversion process using moving average. In the example in FIG. 5, the electric power system frequency f is 50 Hz, and the sample rate of data received from the MU is 96 f (4800 Hz). It is also illustrated that the received data is up-converted to 480 f, which is one time the least common multiple 480 f of 96f, 80 f, and 12 f.

In FIG. 5, the horizontal axis shows time t. The short arrow in chart (A) of FIG. 5 shows the timing of sampling of the received data, the short arrow in chart (B) of FIG. 5 shows the timing of sampling of data after up conversion, and the bold solid arrow in chart (D) of FIG. 5 shows the timing of sampling of data after down conversion. The white circle in chart (B) of FIG. 5 shows the actual sample point of the received data.

When sampling data at 96 f (timing in chart (A) of FIG. 5) is up-converted to sampling data at 480 f (timing in chart (B) of FIG. 5), 480 f is five times 96f and, first of all, four data points (black circles) are added at regular intervals between adjacent received data points (white circles). In this case, as shown in chart (C) of FIG. 5, the added four data (black circles) have the same value as the latest data point (white circle) until the next new data point (white circle) is received. Therefore, the data point row after such data addition processing is stepwise as shown by white circles and black circles in chart (C) of FIG. 5.

Next, an averaging process (that is, moving average processing) is performed to successively average consecutive five data. Specifically, the sample value at present time t is denoted as I(t), and the sampling data at 96f is denoted as I(t), I(t−T), I(t−2T), . . . . The sampling data at 480 f before the averaging process is denoted by I(t), I(t−1), I(t−2), . . . , and the sampling data at 480 f after the averaging process is denoted as Ir(t), Ir(t−1), Ir(t−2), . . . . Then, for the data before the averaging process, the equations below hold:

$$I(t-T)=I(t-1)=I(t-2)=I(t-)=I(t-4)=I(t-5) \quad (5)$$

$$I(t-2T)=1(t-6)=1(t-7)=1(t-8)=1(t-9)=1(t-10) \quad (6).$$

This is applicable to the data before time t−3T.

Subsequently, for the data after the averaging process (moving average processing) of successively averaging consecutive five data, the equations below hold:

$$Ir(t)=(1/5)\cdot I(t)+(4/5)\cdot I(t-T) \quad (7)$$

$$Ir(t-1)=(5/5)\cdot I(t-T) \quad (8)$$

$$Ir(t-2)=(4/5)\cdot I(t-T)+(1/5)\cdot I(t-2T) \quad (9)$$

$$Ir(t-3)=(3/5)\cdot I(t-T)+(2/5)\cdot I(t-2T) \quad (10)$$

$$Ir(t-4)=(2/5)\cdot I(t-T)+(3/5)\cdot I(t-2T) \quad (11)$$

$$Ir(t-4)=(1/5)\cdot I(t-T)+(4/5)\cdot (t-2T) \quad (12).$$

According to the equations above, it is understood that the interpolated data point after the moving average processing is the same as the one obtained by linear interpolation using the received data points on both sides thereof. In chart (C) of FIG. 5, the actual waveform and the waveform after the averaging process are shown by solid lines. The waveform after the averaging process can be roughly superimposed on the actual waveform by shifting the data points for the amount of time corresponding to four sample points.

In general, when the received data is up-converted to data at m-time sample rate, (m−1) new data points are arranged at regular intervals between adjacent data points. In this case, as shown in chart (C) of FIG. 5, (m−1) data points are arranged at temporally regular intervals so as to have the same value as the latest sample value until the next new sample value is received. Next, moving average processing is performed to successively average every m data points in succession. This results in data after up conversion. Subsequently, if necessary, data points may be shifted by the amount of time corresponding to (m−1) times the sampling period of the data after up conversion in order to correct a time delay. If not necessary, this process may not be performed.

Referring to FIG. 3 and FIG. 4 again, in the next step S160, digital filter processor 65 (DF2) executes a digital filtering process for the data up-converted to the sample rate of 480 Fn. This can remove a waveform distortion caused by the up-conversion process performed in step S150 and configures an antialiasing filter for the down-conversion process (sampling at a relay computation frequency) to be executed in step S180 later. For example, when the relay computation period is 12 f, a frequency component higher than 6 f is an error, and a frequency component with an order higher than 6 f is attenuated in order to remove the error component.

Digital filter processor 65 (DF2) having the characteristics described above can be configured with any known digital filter. For example, in the case of a FIR filter (Finite Impulse Response Filter) that performs weighted averaging of input signal values at present and at points of time in the past, a weight (also referred to as tap coefficient) is properly set to implement a low pass filter (high frequency cut-off filter) having a desired cut-off frequency.

In the next step S170, data storage 66 (DT1) stores the latest data at a sample rate of 480 Fn after the digital filtering process for the amount of time necessary for relay computation. In the case of normal relay computation, it is necessary to reserve a storage area for storing data for the amount of time, for example, corresponding to three cycles in the system frequency. When a differential process between the waveform after failure and the waveform before failure is performed for a relay computation process, it is necessary to reserve a storage area for the amount of time longer than the time during which the system failure occurs (for example, about 500 milliseconds).

In the next step S180, down converter 67 (DOWNCONV) extracts data from data storage 66 (DT1) every number of data points corresponding to the relay computation period determined in step S140. When the system frequency calculated by frequency computer 61 (FCALC) is equal to the rated frequency, for example, as shown in chart (D) of FIG. 5, data is extracted every 40 sampling data points corresponding to electrical angle 30° (relay computation period), from the data at a sample rate of 480 Fn. That is, 39 data points between a data point necessary for relay computation and the data are decimated (that is, frequency down-conversion is performed).

In the foregoing, when the calculated system frequency is greater than the rated frequency, the number of data points corresponding to electrical angle 30° (relay computation period) is smaller than 40 in accordance with the amount of change in frequency. Conversely, when the calculated system frequency is smaller than the rated frequency, the number of data points corresponding to electrical angle 30° is greater than 40. As previously explained, in step S140, sample timing controller 62 (ST) determines the number of data points corresponding to the relay computation period, based on the table that defines the relation between the relay computation period and the number of data points, for each frequency (which will be described later in FIG. 6).

In the next step S190, relay computer 69 (RY) performs relay computation using the data stored in data storage 68 (DT2). As a result of relay computation, if it is determined that a failure occurs in the electric power system (YES in step S200), relay computer 69 (RY) outputs a trip signal via digital output circuit 44. If no failure occurs in the electric power system (NO in step S200), the process from step S110 to step S190 above is repeated.

Detail of Method of Determining Number of Data Points Corresponding to Relay Computation Period FIG. 6 is a diagram showing an example of the table for determining the number of data points corresponding to the relay computation period in step S140 in FIG. 4.

In the table in FIG. 6, the rated frequency Fn is 50 Hz and the maximum variation width is 1 Hz (that is, −49 Hz to +51 Hz). Although 49.0, 49.5, 49.9, 50.0, 50.1, 50.5, 51.0 Hz are shown as typical examples, data can be delimited in any width. For example, when the frequencies are delimited every 0.1 Hz, the frequencies within ±0.05 Hz of the shown frequency fall within the frequency of interest. For example, the frequencies greater than −49.95 Hz and equal to or smaller than 50.05 Hz fall within 50.0 Hz. The frequency interval width may be finer, for example, every 0.01 Hz. In FIG. 6, a case where the rated frequency is 60 Hz with the same frequency variation ratio is also provided.

For each system frequency, the correspondence between the electrical angle corresponding to an integer multiple of the relay computation period and the number of data points after up conversion is shown. In the example in FIG. 6, the relay computation period is 12 f (relay computation is performed every electrical angle 30° at the rated frequency), and the sample rate of data after up conversion is 480 Fn. That is, the table in FIG. 6 shows that, every electrical angle 30°, data preceding by each electrical angle is expressed as data preceding by the corresponding number of data points, in terms of the number of data points after up conversion.

Figures 7A, 7B:
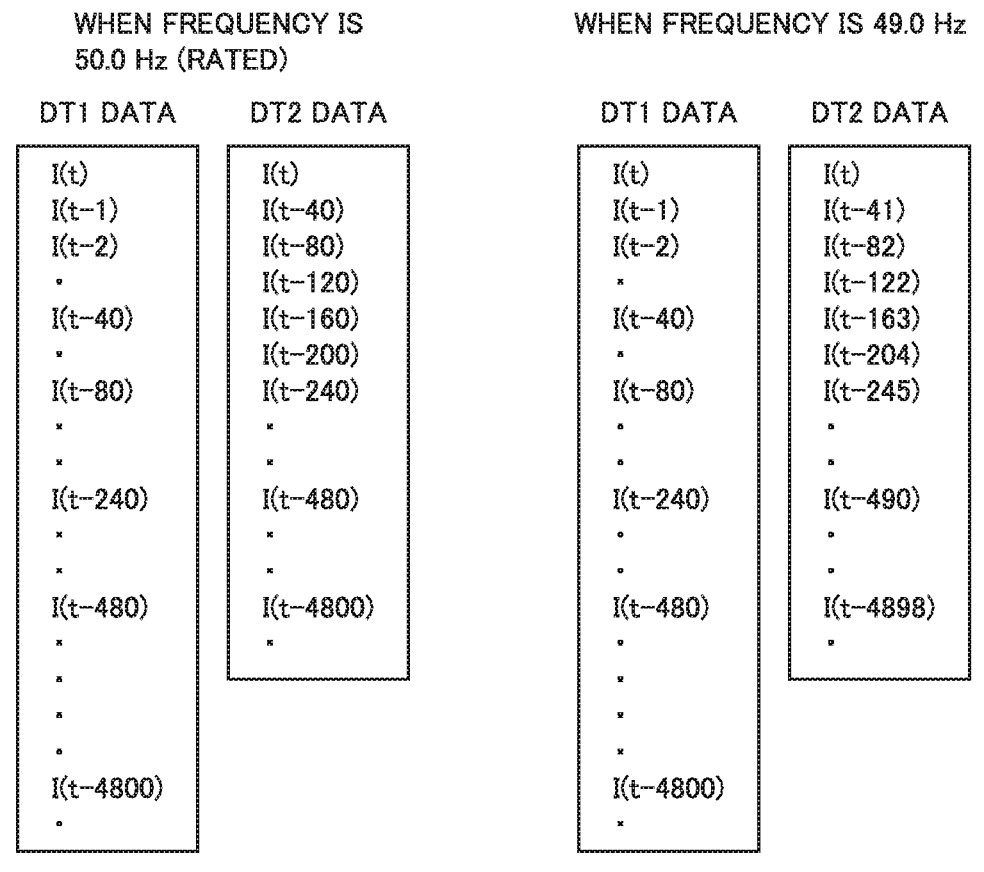

FIGS. 7A and 7B are diagrams for explaining an example of performing a down-conversion process using the table shown in FIG. 6. FIG. 7A shows a case where the system frequency is equal to the rated frequency 50 Hz, and FIG. 7B shows a case where the system frequency changes to 49 Hz.

Referring to FIG. 7A, when the system frequency f is equal to the rated frequency Fn (=50 Hz), data at 480 Fn stored in data storage 66 (DT1) in FIG. 3 is denoted as I(t), I(t−1), I(t−2), . . . . Here, referring to the column with the frequency 50.0 Hz (frequency variation ratio 0.0%) in the table in FIG. 6, the data points preceding the data point at the present time by electrical angles 30°, 60°, 90°, . . . correspond to data points preceding the present time by 40 samples, 80 samples, 120 samples, respectively, in terms of data with the sample rate of 480 Fn (=480 f). Therefore, the data after down conversion stored in data storage 68 (DT2) in FIG. 3 is I(t), I(t−40), I(t−80), I(t−120), . . . .

It should be noted that data point I(t) at the present time is selected in accordance with the system frequency f, and the data point row I(t), I(t−40), I(t−80), . . . is not reselected every time in accordance with the system frequency f. For example, data point I(t) selected at a certain point of time is used as it is as a data point 30° before the present time, when the next data point is selected after the elapse of time corresponding to electrical angle 30° (corresponding to 40 samples in the data after up conversion).

Referring to FIG. 7B, when the system frequency changes to 49 Hz, the data at 480 Fn stored in data storage 66 (DT) in FIG. 3 is the same as when the system frequency is the rated frequency. Here, referring to the column with the frequency 49.0 Hz (frequency variation ratio −2.0%) in the table in FIG. 6, the data point 30° before the present time in electrical angle corresponds to the data point 41 points before (+1 compared to 50 Hz), in terms of the number of data points, and the data point 60° before the present time in electrical angle corresponds to the data point 82 points before (+2 compared to 50 Hz) in terms of the number of data points. In general, when the system frequency is 49 Hz, the data point m−30° (m is an integer equal to or greater than 1) before the present time in electrical angle corresponds to the data point (50 Hz/49 Hz)·m·40 points before (m is an integer equal to or greater than 1), in terms of data at a sample rate of 480 Fn. It is noted that the number of data points is rounded to the nearest integer. Therefore, the data after down conversion stored in data storage 68 (DT2) in FIG. 3 is I(t), I(t−41), I(t−82), I(t−122), . . . .

As explained in FIG. 7A, it should be noted that data point I(t) at the present time is selected in accordance with the system frequency f, and I(t), I(t−41), I(t−82), . . . is not reselected every time in accordance with the system frequency f. For example, data point I(t) selected at a certain point of time is used as it is as a data point 30° before the present time, after the elapse of the time corresponding to electrical angle 30° (corresponding to 41 samples in the data after up conversion).

For simplicity of the table in FIG. 6, the relation between the electrical angle (that is, 30°, 60°, 90°, . . . ) corresponding to an integer multiple of the relay computation period and the number of data points is shown, up to the preceding one cycle, and for the older data, only the number of data points for each cycle may be shown. In this case, the number of data points corresponding to electrical angle δ one cycle before (electrical angle 360° before) to two cycles before (electrical angle 720° before) can be obtained by adding the number of data points one cycle before and the number of data points corresponding to the angle obtained by subtracting 360° from the electrical angle δ. For example, when the system frequency is 49 Hz, the number of data points corresponding to data 390° before the present time in electrical angle is 531, which is obtained by adding the number of data points 490 corresponding to one cycle before and the number of data points 41 corresponding to 30° before the present time in electrical angle.

The number of samples corresponding to the relay computation period can be directly obtained by computation, rather than searching the table for the corresponding number of data points. Specifically, the rated frequency is denoted as Fn, the system frequency at the present time is denoted as f, the relay computation frequency is denoted as Q·f (Q is an integer), and the sample rate of data after up conversion is denoted as P·Q·Fn (P is an integer). Then, when the system frequency f is equal to the rated frequency Fn, the number of data points after up conversion corresponding m times (m is an integer equal to or greater than 1) the relay computation period is given by m·P. On the other hand, when the system frequency at the present time changes to f that is a value different from the rated frequency Fn, the number of data points after up conversion corresponding to m times (m is an integer equal to or greater than 1) the relay computation period is m·P·Fn/f. The value in the table in FIG. 6 is obtained by rounding the result of this calculation to the nearest integer.

When the CPU has a sufficient processing capacity, it is desirable to obtain the number of data points corresponding to an integer multiple of the relay computation period by the computation above. When the memory has a sufficient capacity, it is desirable to obtain the number of data points corresponding to an integer multiple of the relay computation period by using the table as shown in FIG. 6.

In the foregoing, the sample rate of data after up conversion is set to one time the least common multiple, 480 Fn, of the sample rate 96 Fn before up conversion (where the rated frequency is 50 Hz) and 80 Fn (where the rated frequency is 60 Hz) and the relay computation frequency 12 f (equal to 12 Fn). However, the sample rate of data after up conversion may be equal to or greater than twice the least common multiple 480 Fn. In this way, by increasing the sample rate of data after up conversion, the number of data points corresponding to the relay computation period can be adjusted more finely according to variation in system frequency, thereby reducing errors in protective relay computation.

Modification of Table in FIG. 6

FIG. 8 is a diagram showing another example of the table for determining the number of data points in step S140 in FIG. 4. In the table in FIG. 6, the range of system frequency is divided by 0.1 Hz, whereas in the table in FIG. 8, the range of system frequency is divided by 0.3125%.

Specifically, in the example in FIG. 8, the sample rate of data after up conversion is eight times greater than 480 Fn. In this case, the number of data points P (in the case of the rated frequency) corresponding to electrical angle 30° which is a relay computation period is 320. The interval width α[%] of frequency is defined as the reciprocal of P (1/P). By dividing the range of system frequency by such an interval width α, the difference between the number of data points in the case of the rated frequency and the number of data points in the case of deviation from the rated frequency can be proportional to the amount of change in electrical angle. Therefore, the number of data points corresponding to an electrical angle can be obtained more accurately.

The number of data points corresponding to data electrical angle 30° before the present time is associated with frequency, as follows. In the following, f is the frequency measured value, Fn is the rated frequency, P is the number of data points after up conversion corresponding to the relay computation period (in the table in FIG. 8, P=480·8/12=320), a is the reciprocal of P (in the table in FIG. 8, α=1/320=0.3125%), and g is a positive integer including zero that determines the range of measured frequency.

In the case where the system frequency f is equal to or smaller than the rated frequency Fn:
when Fn·(1−α/2)<f≤Fn·(1+α/2), the corresponding number of data points is P;
when Fn·((1−(α/2))<f≤Fn·((1−3(α/2)), the corresponding number of data points is P+1;
when Fn·((1−3(α/2))<f≤Fn·((1−5(α/2)), the corresponding number of data points is P+2;
in general, when Fn·((1−(2g+1)(α/2))<f≤Fn·((1−(2g+3(α/2)), the corresponding number of data points is P+(g+1).

In the case where the system frequency f is greater than the rated frequency Fn:
when Fn·((1+(α/2))<f≥Fn·((1+3(α/2)), the corresponding number of data points is P−1;
when Fn·((1+3(α/2))<f≤Fn·((1+5(α/2)), the corresponding number of data points is P−2;
in general, when Fn·((1+(2g+1)(α/2))<f≤Fn·((1+(2g+3)(α/2)), the corresponding number of data points is P−(g+1).

In the example described above, the sample rate of data after up conversion is eight times greater than 480 Fn that is the least common multiple of the sample rate before up conversion 96 Fn (when the rated frequency is 50 Hz) and 80 Fn (when the rated frequency is 60 Hz), and the relay computation frequency 12 f (equal to 12 Fn). If the sample rate of data after up conversion is further increased, for example, to 16 times greater than the least common multiple 480 Fn, then α=0.156%. Thus, the number of data points corresponding to the measured frequency is further divided, and the appropriate number of data points can be selected from among the further divided number of data points, thereby achieving relay computation with higher precision.

Modification to First Embodiment

In the foregoing embodiment, when down converter 67 (DOWNCONV) extracts data from data storage 66 (DT1), sample timing controller 62 (ST) determines the number of data points by which a data point is to be extracted, based on the frequency computation result of frequency computer 61 (FCALC).

As a modification thereto, sample timing controller 62 (ST) may function as a timing signal generator that generates a timing signal having a period corresponding to the frequency computation result by frequency computer 61 (FCALC). In this case, sample timing controller 62 (ST) outputs the generated timing signal to down converter 67 (DOWNCONV). Down converter 67 (DOWNCONV) extracts a data point immediately after the timing specified by the timing signal or a data point closest to the timing from data storage 66 (DT1). A more specific description will be given below with reference to the drawing.

Figure 9:
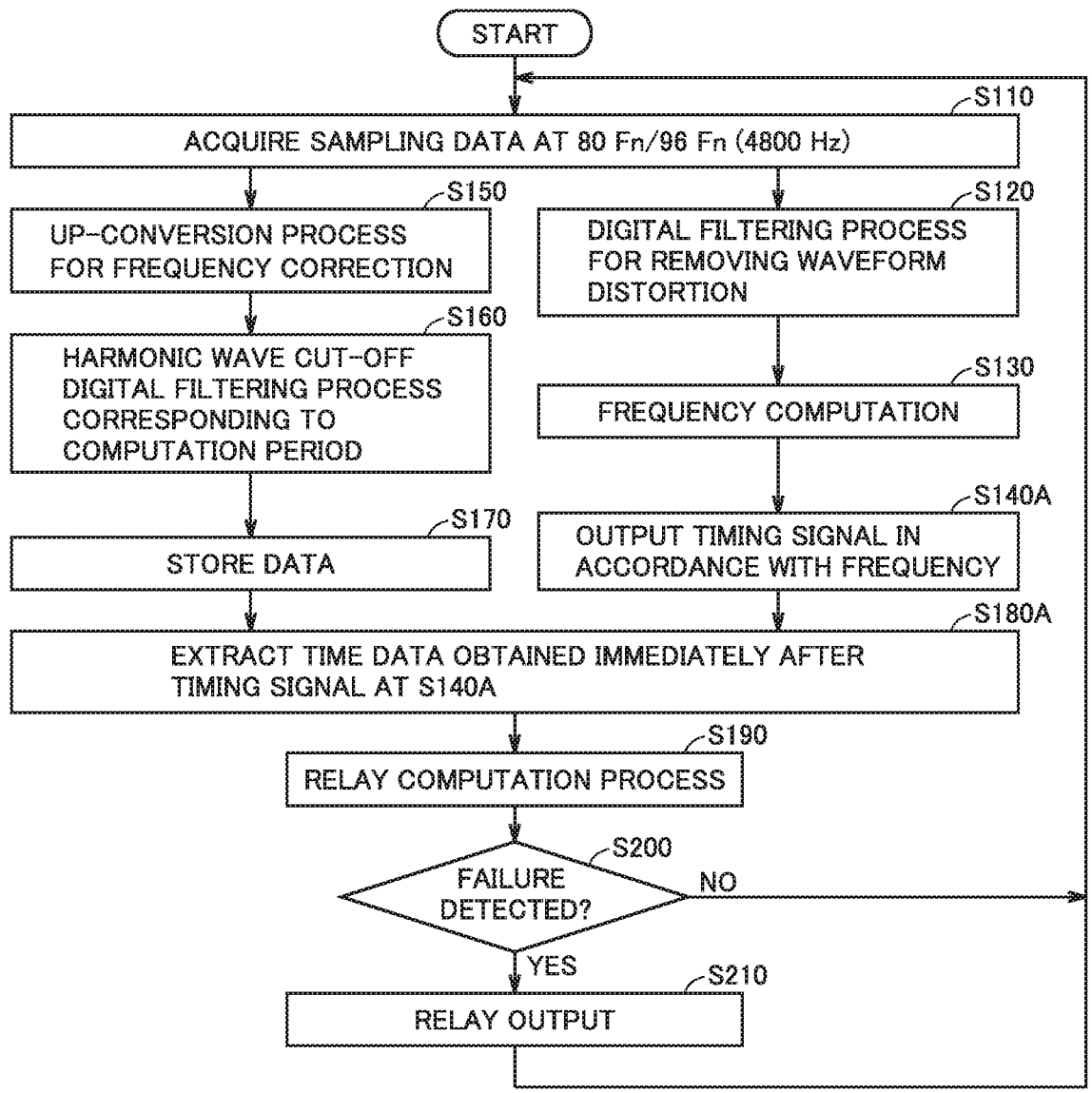
FIG. 9 is a flowchart showing the operation of the IED in a modification to the first embodiment.

FIG. 9 is a flowchart showing the operation of the IED in a modification to the first embodiment. In the flowchart in FIG. 9, steps S140, S180 in the flowchart in FIG. 4 are changed to steps S140A, S180A, respectively. Except for this, FIG. 9 is similar to FIG. 4 and the same process is denoted by the same reference sign and will not be further elaborated.

Referring to FIG. 9, at step S140A, sample timing controller 62 (ST) generates a timing signal (corresponding to the reference sign 75 in FIG. 3) having a computation frequency (for example, 12 f) corresponding to the calculated system frequency f and outputs the generated timing signal 75 to down converter 67 (DOWNCONV). Specifically, the period of timing signal 75 is smaller as the calculated value of system frequency is greater than the rated frequency, and it is larger as the calculated value of system frequency is smaller than the rated frequency.

In step S180A, down converter 67 (DOWNCONV) extracts, from data storage 66 (DT1), a data point immediately after or a data point immediately before the timing specified by the timing signal generated in step S140A or a data point immediately before or immediately after the specified timing by measuring the time difference from the immediately preceding data point to the specified timing. Thus, although the number of data points is actually not controlled, data points are consequently extracted from data storage 66 (DT1) every number of data points in accordance with the system frequency.

Figure 10:
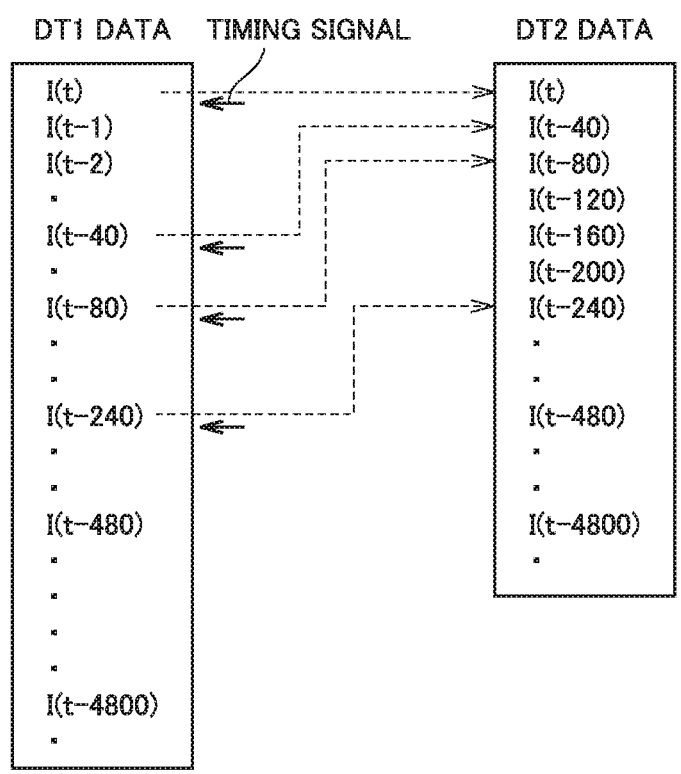
FIG. 10 is a diagram for explaining a down-conversion process in the modification to the first embodiment.

FIG. 10 is a diagram for explaining the down-conversion process in the modification to the first embodiment. The illustration in FIG. 10 corresponds to FIG. 7A, where the system frequency f is equal to the rated frequency Fn (Fn=50 Hz). Down converter 67 (DOWNCONV) extracts a data point immediately after the timing specified by the timing signal from data storage 66 (DT1) and stores the extracted data point into data storage 68 (DT2). As a result, the data after down conversion stored in data storage 68 (DT2) in FIG. 3 is I(t), I(t−40), I(t−80), I(t−120), . . . , which agree with those in FIG. 7A.

Effects

As described above, in the IED according to the first embodiment, current data and voltage data are up-converted to a frequency higher than the sample rate at the time of A/D conversion in the MU by interpolation. Subsequently, current data and voltage data for relay computation are generated through a down-conversion process (decimation process). The sample rate of data after up conversion is set to a multiple of the least common multiple of the sample rate at the time of A/D conversion and the relay computation frequency, so that the same relay computation algorithm can be used independently of the rated frequency.

Furthermore, the system frequency at the present time is measured, and the period of data to be extracted when a down-conversion process is performed (that is, the number of data points corresponding to the relay computation frequency) is adjusted in accordance with the measured system frequency. The relay computation period thus can be kept constant irrespective of variation in system frequency. As a result, even when the system frequency varies, the same relay computation algorithm as for the rated frequency can be used.

Second Embodiment

Problem to be Solved

As explained in FIG. 3, the latest current data and voltage data having a sample rate after up conversion are stored for the amount of time necessary for relay computation in data storage 66 (DT1) of IED 40. In the case of normal relay computation, a storage area for storing data for the amount of time corresponding to three cycles in system frequency is reserved. When a differential process between the waveform after failure and the waveform before failure is performed for relay computation, it is necessary to reserve a storage area for the amount of time longer than the time during which a system failure occurs (for example, about 500 milliseconds). In this case, the data region is larger than usual because the sample rate is up-converted.

The second embodiment provides means for reducing the data storage area in the latter case. Specifically, data up to a few cycles before the present time and data in a few cycles before occurrence of a failure are stored, and data therebetween is not stored, thereby reducing the amount of data to be stored. A detailed description will be given below with reference to the drawings.

Configuration of IED

Figure 11:
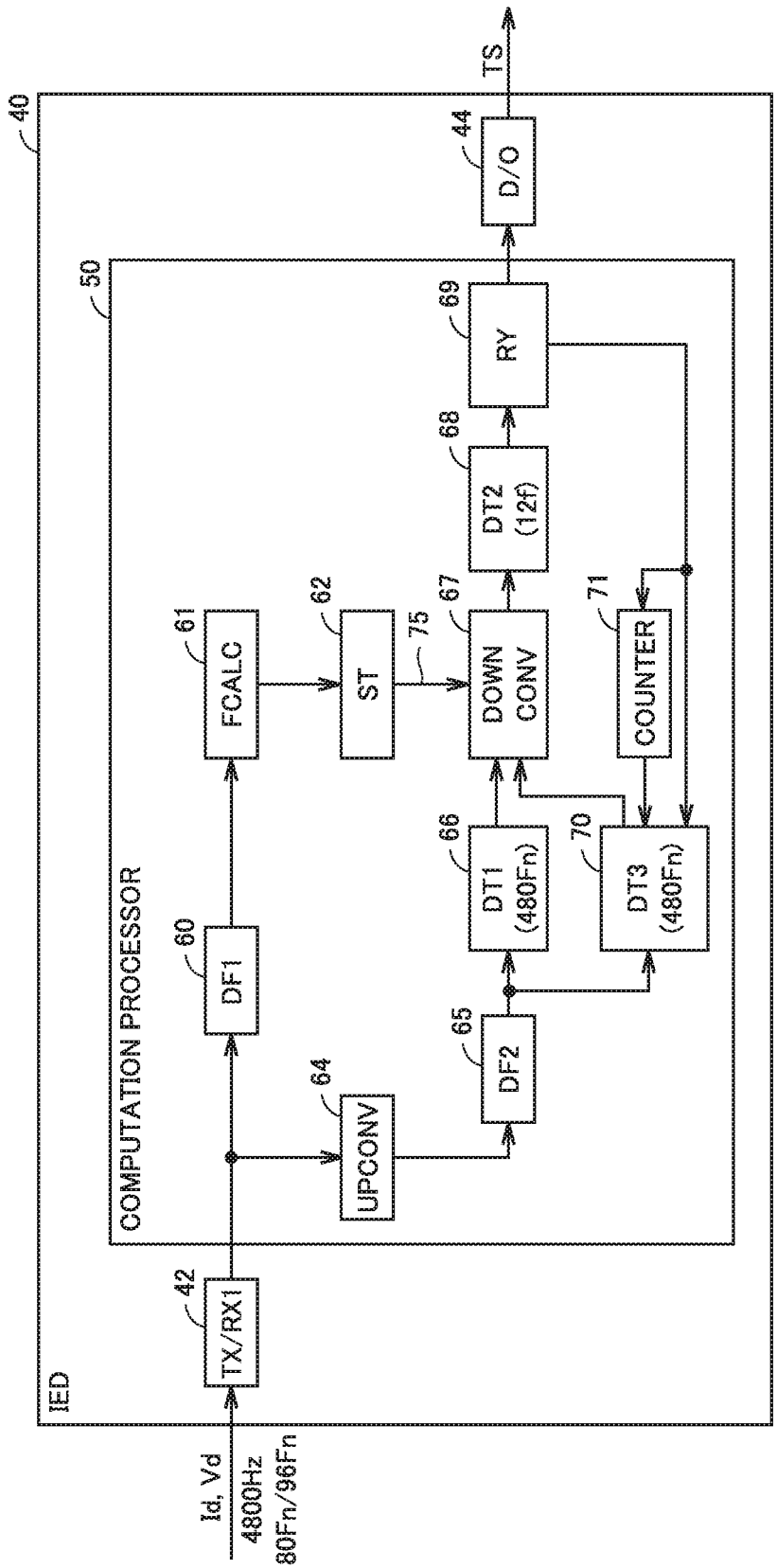
FIG. 11 is a functional block diagram of the IED in a second embodiment.

FIG. 11 is a functional block diagram of the ED in the second embodiment. The functional block diagram in FIG. 11 corresponds to FIG. 3 in the first embodiment. Specifically, computation processor 50 of IED 40 in FIG. 11 differs from computation processor 50 in FIG. 3 in that it further includes a data storage 70 (DT3) and a counter 71.

In FIG. 11, current data and voltage data after the filtering process output from digital filter processor 65 (DF2) are input to data storage 66 (DT1) and also stored in data storage 70 (DT3). A control signal from relay computer 69 (RY) is also input to data storage 70 (DT3) and counter 71. This control signal indicates, for example, failure detection or return to the normal state.

Data storage 70 (DT3) has a latch function (stop data update) and a latch-release function (resume data update). Specifically, when receiving a control signal indicating failure detection (referred to as failure detection signal) from relay computer 69 (RY), data storage 70 (DT3) latches data stored at the present time (that is, stop update of stored data). When a predetermined time passes since the start of the latch function or when receiving a control signal indicating return to the normal state from relay computer 69 (RY), data storage 70 (DT3) releases the latch of the stored data (that is, resume data update). Such functions of data storage 70 are implemented by CPU 51 in FIG. 2 controlling data write into a region corresponding to data storage 70 (DT3) of RAM 52.

Counter 71 starts counting when receiving a failure detection signal from relay computer 69 (RY). Counter 71 is to detect how many periods have passed with reference to the sampling period of time-series data after up conversion. The counter value (corresponding to the number of periods) at the present time by counter 71 is stored into data storage 70 (DT3). Counter 71 finishes counting (counter value is reset to zero) when receiving a control signal indicating return to the normal state from relay computer 69 (RY).

Except for this configuration, FIG. 11 is similar to FIG. 3 and the same or corresponding parts are denoted by the same reference signs and will not be further elaborated.

Operation of IED

Figure 12:
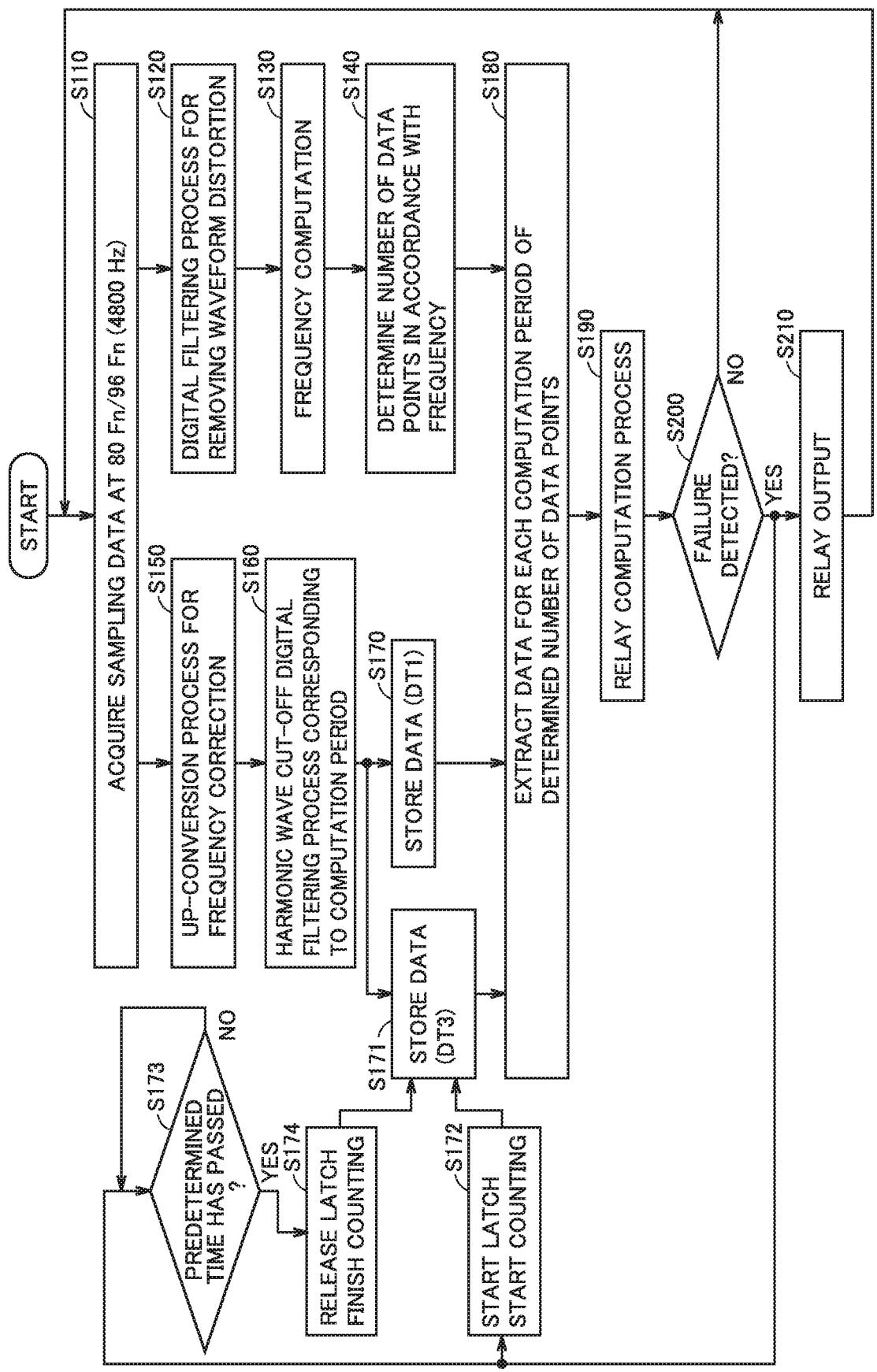
FIG. 12 is a flowchart showing the operation of the IED in FIG. 11.

FIG. 12 is a flowchart showing the operation of the IED in FIG. 11. Referring to FIG. 11 and FIG. 12, the operation of the IED different from the first embodiment (the flowchart in FIG. 4) will be mainly described below.

Specifically, the flowchart in FIG. 12 differs from the flowchart in FIG. 4 in that it further includes steps S171, S172, S173, S174. As explained in FIG. 4, in step S160, digital filter processor 65 (DF2) executes a digital filtering process for data up-converted to the sample rate 480 Fn.

In the next step S170, data storage 66 (DT) stores the latest data of electrical quantity after the digital filtering process (data up-converted to 480 Fn) for a necessary period of time. Concurrently, in step S171, data storage 70 (DT3) stores the latest data of electrical quantity after the digital filtering process above for a necessary period of time.

The data storage duration is set to a period of time used in the protective element that most requires data in the past among protective elements that do not particularly require data before occurrence of a failure. The normal data storage duration is up to about three cycles before the present time. In the present embodiment, considering increase of the number of data points due to frequency variation, a margin of one cycle in the rated frequency is added to the data storage duration. That is, each of data storage 66 (DT1) and data storage 70 (DT3) stores data up to four cycles before the present time in the case of the rated frequency.

Step S172 is executed when relay computer 69 (RY) detects a system failure (YES in step S200). In step S172, when a system failure is detected, data storage 70 (DT3) stops update of data storage (that is, starts data latch). The data before the failure is thus stored in data storage 70 (DT3). Furthermore, counter 71 starts counting from zero. The counter value at the present time is stored in data storage 70 (DT3).

Here, relay computer 69 (RY) can detect a system failure fast (within one cycle after occurrence of a failure). Therefore, assuming that data storage 70 (DT3) stores data up to four cycles before the present time, three cycles excluding one cycle before and after failure occurrence can be used as data before occurrence of the system failure.

Step S174 is executed when a predetermined time (for example, 500 milliseconds) passes since relay computer 69 (RY) detects a system failure or since data storage 70 (DT3) starts latching (YES in step S173), or when a release signal is output from relay computer 69 (RY). In step S174, data storage 70 (DT3) resumes data storage (that is, releases data latch). Furthermore, counter 71 finishes counting. The counter value is reset to zero.

Figure 13A:
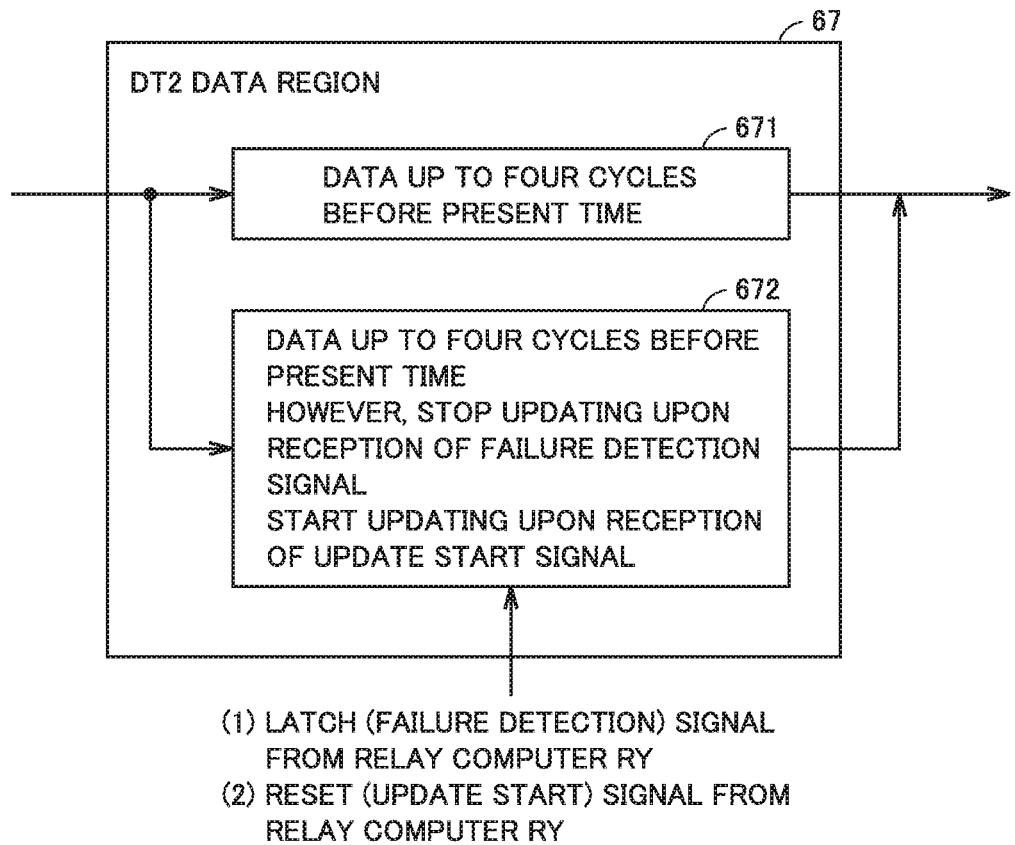
FIGS. 13A and 13B are diagrams for explaining time-series data stored after the down-conversion process in step S180 in FIG. 12.
Figure 13B:
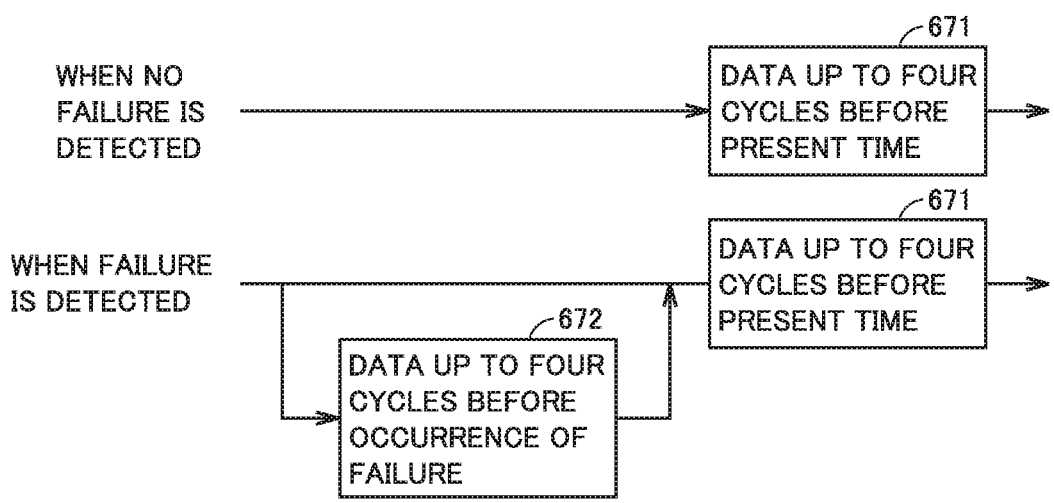

FIGS. 13A and 13B are diagrams for explaining time-series data stored after the down-conversion process in step S180 in FIG. 12.

In step S180 in FIG. 12, down converter 67 (DOWN-CONV) extracts data from data storage 66 (DT1) and data storage 70 (DT3) every number of data points corresponding to the relay computation period determined in step S140. As shown in FIG. 13A, the data extracted from data storage 66 (DT1) is stored into a region 671 in data storage DT2(68), and the data extracted from data storage 70 (DT3) is stored into a region 672 in data storage DT2(68).

As already explained above, since the data stored in data storage 66 (DT1) and data storage 70 (DT3) is data up to four cycles before the present time, the data stored in regions 671, 672 in data storage DT2(68) is data up to almost four cycles before the present time. However, since the number of data points corresponding to the relay computation period is adjusted in accordance with the system frequency at the present time, the data stored in regions 671, 672 is precisely not equivalent to four cycles.

The data extracted from data storage 70 (DT3) to be stored in region 672 is in a state in which update is stopped when a latch (failure detection) signal is output from relay computer 69 (RY), and update is started when a reset (update start) signal is output from relay computer 69 (RY). Therefore, as shown in FIG. 13B, when a system failure is not detected by relay computer 69 (RY), the data up to four cycles before the present time that is stored in region 671 in data storage DT2(68) is used for relay computation. When a system failure is detected by relay computer 69 (RY), the data up to four cycles before the present time that is stored in region 671 in data storage DT2(68) and the data up to four cycles before the failure detection that is stored in region 672 in data storage DT2(68) are used.

FIGS. 14A and 14B are illustrations of data stored in a plurality of data storages in FIG. 11. FIG. 14A shows the case where the system frequency is equal to the rated frequency 50 Hz, and FIG. 14B shows the case where the system frequency changes to 49 Hz.

Referring to FIG. 14A, when the system frequency is equal to the rated frequency 50 Hz, the time-series data of four cycles at sample rate 480 Fn that is stored in data storage 66 (DT1) in FIG. 11 is denoted as I(t), I(t−1), I(t−2), . . . , I(t−1920).

Letting the counter value be m, the time-series data stored in data storage 70 (DT3) in FIG. 11 is denoted as I(t−m), I(t−(m+1)), I(t−(m+2)), . . . , I(t−(m+1920)). When a system failure is not detected by relay computer 69 (RY), the counter value m is zero. Therefore, the time-series data stored in data storage 70 (DT3) is the same as the time-series data stored in data storage 66 (DT1). The counter value m is incremented by one every time the sampling period of the time-series data after up conversion passes.

Here, referring to the column with the frequency 50.0 Hz (frequency variation ratio 0.0%) in the table in FIG. 6, the data preceding the data at the present time by 30°, 60°, 90°, . . . in electrical angle corresponds to the data preceding the data at the present time by 40 samples, 80 samples, 120 samples, . . . respectively, in terms of data with a sample rate of 480 Fn (=480 f).

Therefore, the time-series data after down conversion to be stored in region 671 in data storage 68 (DT2) in FIG. 13A is I(t), I(t−40), I(t−80), I(t−120), . . . , I(t−1920). Letting the counter value be m, the time-series data after down conversion that is stored in region 672 in data storage 68 (DT2) is I(t−m), I(t−(m+40)), I(t−(m+80)), I(t−(m+120)), . . . , I(t−(m+1920)).

Referring to FIG. 14B, when the system frequency changes to 49 Hz, the time-series data of four cycles at sample rate 480 Fn that is stored in data storage 66 (DT1) and data storage 70 (DT3) in FIG. 11 is the same as when the system frequency is the rated frequency.

Here, referring to the column of the frequency 49.0 Hz (frequency variation ratio −2.0%) in the table in FIG. 6, the data 30° before the present time in electrical angle corresponds to the data 41 points (+1 with respect to 50 Hz) before, in terms of the number of data points, and the data 60° before the present time in electrical angle corresponds to the data 82 points (+2 with respect to 50 Hz) before, in terms of the number of data points. Similarly, the data one cycle before the present time corresponds to the data 490 points before, in terms of the number of data points, and the data three cycles and 330° before the present time corresponds to the data 1918 points before, in terms of the number of data points.

Therefore, the time-series data after down conversion that is stored in region 671 in data storage 68 (DT2) in FIG. 13A is I(t), I(t−41), I(t−82), I(t−122), . . . , I(t−1918). Letting the counter value be m, the time-series data after down conversion that is stored in region 672 in data storage 68 (DT2) is I(t−m), I(t−(m+41)), I(t−(m+82)), I(t−(m+122)), I(t−(m+1918)).

When relay computer 69 (RY) performs relay computation using the data three to four cycles before the present time and the data before failure, relay computer 69 (RY) extracts data of a necessary number of cycles from region 672 in data storage 68 (DT2). By using the counter value m, the data before failure an integer cycles before the present time can be obtained as follows.

The timing of failure detection by relay computer 69 (RY) is less than one cycle after occurrence of a failure. The counter value at the present time is denoted as X, the number of data points corresponding to one cycle in accordance with the system frequency is denoted as S (S changes with a difference between the system frequency and the rated frequency), and data of electrical quantity at the present time is denoted as I(t). Then, data at the time of failure detection (at the start of latching by data storage 70 (DT3)) is I(t−X). I(t−X) means that the data is X periods before the present time with reference to the sampling period after up conversion.

Therefore, letting the data before failure an integer cycles before the present time be I(t−(X+Y)), the relation below holds:

$$X+Y=N \cdot S \quad (13).$$

In the equation above, N is an integer equal to or greater than 1, and Y is an integer that satisfies 0≤Y<S. Therefore Y can be calculated by $$Y=S \cdot N - X \quad (14).$$

In Equation (14), since S and X are known (S changes in accordance with the system frequency), Y can be determined by selecting N such that 0≤Y<S.

Effects

In this manner, in the intelligent electronic device in the second embodiment, compared with the first embodiment, data storage 70 (DT3) is provided for separately saving data of a few cycles before failure detection. This configuration can reduce the amount of stored time-series data of electrical quantity necessary for relay computation.

Third Embodiment

Problem to be Solved

When a current differential relay for power transmission line protection is configured using a protective system including a MU and an IED, it is necessary to perform current differential relay computation using data detected at the same time in the MUs on both ends of the power transmission line. In the conventional method, the synchronization between the IEDs on both ends of the power transmission line is established and then a synchronizing signal is supplied from each LED to the corresponding MU (for example, Japanese Patent Laying-Open No. 2015-089182 (see PTL 1)).

However, the standards for process bus between MU and IED (EC61850-9-2) at present does not define this synchronizing signal. Therefore, there is no interoperability between IED and MU manufactured by different manufacturers. In addition, the provision of a synchronizing signal from IED to MU as described above is required only when sampling synchronization with the IED installed in a remote electric power substation is required (typically, in the case of a current differential relay), and is not required for other protective relays. In view of such circumstances, there is a demand for a method of achieving sampling synchronization between both ends of the power transmission line without a synchronizing signal. A specific method is described below.

Figure 15:
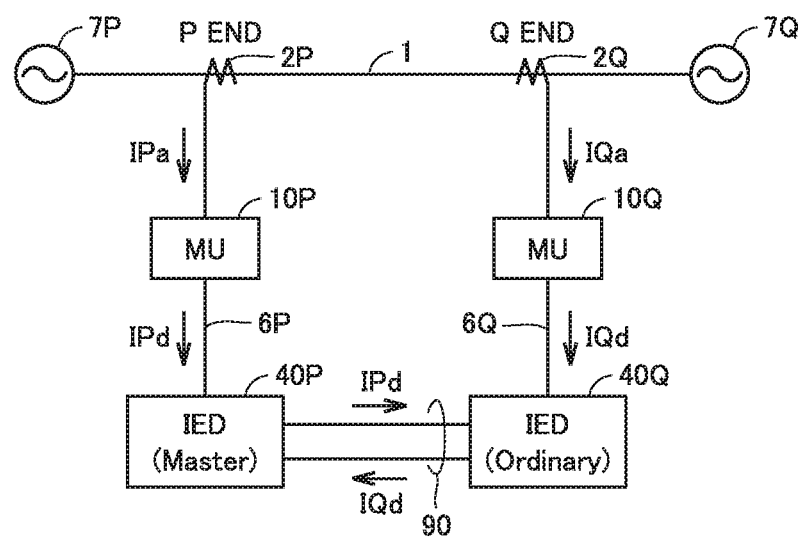
FIG. 15 is a block diagram showing a configuration of a current differential relay for power transmission line protection.

Configuration of Current Differential Relay for Power Transmission Line Protection FIG. 15 is a block diagram showing a configuration of a current differential relay for power transmission line protection.

Referring to FIG. 15, it is assumed that power supplies 7P and 7Q are provided on P end and Q end, respectively, of power transmission line 1. A current transformer 2P converts current flowing through P end of power transmission line 1 into a magnitude suitable for input to MU. Analog current signal IPa from current transformer 2P is input to a MU 10P. MU 10P samples the input current signal IPa at a predetermined sample rate (for example, 4800 Hz) and further performs A/D conversion. The digital current signal IPd after A/D conversion is input to an IED 40P through a process bus 6P.

Similarly, a current transformer 2Q converts current flowing through Q end of power transmission line 1 into a magnitude suitable for input to MU. Analog current signal IQa from current transformer 2Q is input to a MU 10Q·MU 10Q samples the input current signal IQa at a predetermined sample rate (for example, 4800 Hz) and further performs A/D conversion. The digital current signal IQd after A/D conversion is input to an IED 40Q through a process bus 6Q.

IED 40P and IED 40Q exchange digital current signals IPd, IQd on both ends of power transmission line 1 through a digital transmission line 90. Each of IED 40P and IED 40Q thus compares the current signal detected by itself with the current signal by the other and determines the presence/absence of a failure in power transmission line 1 based on the comparison result. For example, when the output of current transformer 2P and the output of current transformer 2Q have the same magnitude and opposite polarities, that is, if the sum of current signal IPd and current signal IQd is zero, there is no failure in the inside of power transmission line 1.

For proper operation of the current differential relay for power transmission line protection, the sampling timing of current signal IPd on P end and the sampling timing of current signal IQd on Q end have to be the same. The synchronization between the sample timings is established while a current signal is mutually transmitted, on the premise that the transmission delay time from the P end-side IED 40P to the Q end-side IED 40Q through digital transmission line 90 is equal to the transmission delay time from the Q end-side IED 40Q to the P end-side IED 40P.

Specifically, IEDs 40P, 40Q in the present embodiment up-convert time-series data of current signals IPd, IQd received from the corresponding MUs 10P, 10Q into, for example, time-series data at an integer multiple of 480 Fn (Fn is the rated frequency), in the same manner as in the first and second embodiments. Next, IEDs 40P, 40Q down-convert the time-series data after up conversion into a relay computation frequency (for example, 12 f). Here, the Q end-side (ordinary side) IED 40Q synchronizes the sample timing of current data IQd after down conversion to the sample timing of current data IPd transmitted from the P end-side (master side) IED 40Q by adjusting data of which sample time is to be selected among the time-series data after up conversion. A detailed description will be given below with reference to the drawings.

Method of Sampling Synchronization

Figure 16:
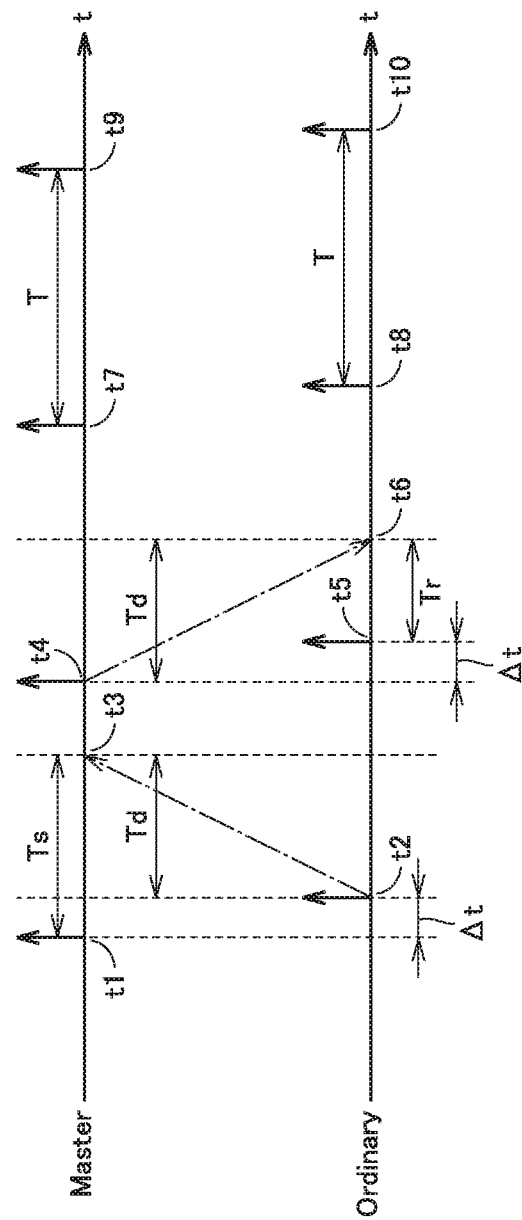
FIG. 16 is a timing chart for explaining a method of sampling synchronization in the current differential relay for power transmission line protection in FIG. 15.

FIG. 16 is a timing chart for explaining a method of sampling synchronization in the current differential relay for power transmission line protection in FIG. 15. The P end-side IED 40P is referred to as master (or parent), and the Q end-side IED 40Q is referred to as ordinary (or child).

Referring to FIG. 15 and FIG. 16, master (P end side) IED 40P transmits current data IPd on the P end side to ordinary (Q end side) IED 40Q through digital transmission line 90, every relay computation period (for example, computation frequency 12 f, where f is the system frequency). Master (Pend side) IED 40P further transmits a synchronizing signal (hereinafter referred to as synchronizing signal SYp) together with current data IPd to ordinary (Q end side) IED 40Q through digital transmission line 90 about once per cycle. In the case of FIG. 16, synchronizing signal SYp is transmitted from master (P end side) IED 40P to ordinary (Q end side) IED 40Q at the timing of times t1, t4, t7, t9.

Similarly, ordinary (Q end side) IED 40Q transmits current data IQd on the Q end side to master (P end side) IED 40P through digital transmission line 90, every relay computation period (for example, computation frequency 12 f, where f is the system frequency). Ordinary (Q end side) IED 40Q further transmits a synchronizing signal (hereinafter referred to as synchronizing signal SYq) together with current data IQd to master (P end side) IED 40P through digital transmission line 90 about once per cycle. In FIG. 16, synchronizing signal SYq is transmitted from ordinary (Q end side) IED 40Q to master (P end side) IED 40P at the timing of times t2, t5, t8, t10.

The reason why synchronizing signals SYp, SYq are transmitted about once per cycle is as follows. Since the transmission/reception time difference Ts or Tr calculated as described later need to be transmitted to the other end, the time of approximately one cycle is necessary as the time required for the transmission. The transmission period of synchronizing signals SYp, SYq may differ from one cycle, depending on the design.

When the sample timings are synchronized between the P end side and the Q end side, times t1, t4, t7, t9 agree with times t2, t5, t8, t10, respectively. In FIG. 16, a deviation Δt occurs in the sample timing, and the sample timing on the Q end side lags behind the sample timing on the P end side by Δt.

Master (P end side) IED 40P measures a transmission/reception time difference Ts from transmission of synchronizing signal SYp to reception of synchronizing signal SYq from the Q end side. The measurement result of transmission/reception time difference Ts is transmitted to ordinary (Q end side) IED 40Q. Ordinary (Q end side) IED 40Q also measures a transmission/reception time difference Tr from transmission of synchronizing signal SYq to reception of synchronizing signal SYp from the P end side. If transmission delay time Td of digital transmission line 90 from the P end-side IED 40P to the Q end-side IED 40Q is equal to transmission delay time Td of digital transmission line 90 from the Q end-side IED 40Q to the P end-side IED 40P, transmission delay time Td is written as:

$$Td = Ts - \Delta t = Tr + \Delta t \tag{15}$$

Therefore, deviation Δt of sample timing is given by $$\Delta t = (Ts - Tr)/2 \tag{16}$$

Ordinary (Q end side) IED 40Q adjusts the data point to be selected such that Δt is zero, when time-series data at 12 f is selected from time-series data at sample rate 480 Fn in the down converter. When Ts>Tr as in FIG. 16, IED 40Q selects a data point at the earlier sample time at the time of down conversion. When Ts<Tr, IED 40Q selects a data point at the later sample time at the time of down conversion.

Deviation Δt of sample timing is calculated, for example, every cycle in accordance with the transmission period of synchronizing signals SYp, SYq. Ordinary (Q end side) IED 40Q shifts the data point to be selected one by one such that Δt is 0, every time Δt is calculated. The reason for shifting one by one is that if data points are shifted to a large degree at a time, the computation period between before and after the shifting is too short, and the effect on protective relay computation is prevented. If there is no influence on computation, the synchronization rate can be increased by increasing the number of data points to be shifted. When deviation Δt of sample timing is calculated every cycle, the sample timing synchronization control is performed every cycle.

Configuration and Operation of IED

Figure 17:
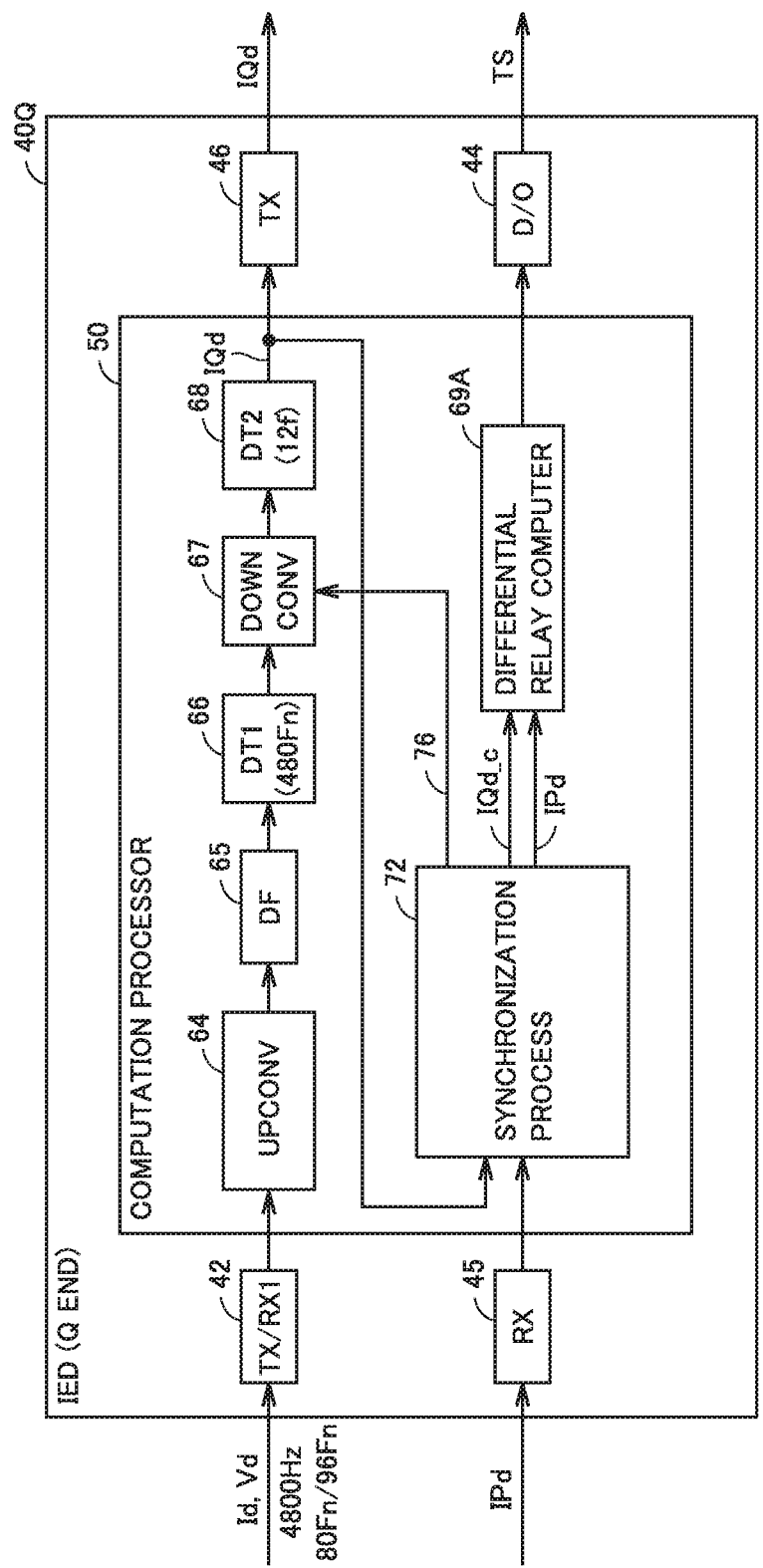
FIG. 17 is a functional block diagram of the Q end-side IED in FIG. 15.

FIG. 17 is a functional block diagram of the Q end-side IED in FIG. 15.

Referring to FIG. 17, interface 41 (see FIG. 2) of IED 400 further includes a receiving circuit 45 (RX) and a transmitting circuit 46 (TX). Receiving circuit 45 (RX) receives current signal IPd (sample rate=12 f, where f is the system frequency) transmitted from the P end-side IED 40P through digital transmission line 90 and receives synchronizing signal SYp and information of transmission/reception time difference Ts (see FIG. 16) on the P end-side IED 40P. Transmitting circuit 46 (TX) transmits current signal IQd (sample rate 12 f) on the Q end side and synchronizing signal SYq to the P end-side IED 40P through digital transmission line 90.

Computation processor 50 (see FIG. 2) of IED 40Q functions as up converter 64 (UPCONV), digital filter processor 65 (DF), data storage 66 (DT), down converter 67 (DOWNCONV), data storage 68 (DT2), synchronization processor 72, and differential relay computer 69A. The same or corresponding functions as in the first and second embodiments are denoted by the same reference signs. The functions above are implemented by CPU 51 operating under instructions of a program. The operation overview of each functional unit is described below.

The sampling data of current signal IQd transmitted from MU 10Q in FIG. 15 through process bus 6Q is received by communication circuit 42 (TX/RX1) of IED 40Q. The sample rate of the received data is, for example, 4800 Hz.

Up converter 64 (UPCONV) converts the sample rate of the received data by communication circuit 42 (TX/RX1) into time-series data at a higher sample rate. Specifically, when the sample rate of the received data is 4800 Hz and the rated frequency Fn is 50 Hz, the received data at sample rate 96 Fn is up-converted to time-series data at sample rate 480 Fn or time-series data at its integer multiple. Here, assuming that the integer multiple is one, when the rated frequency Fn is 60 Hz, the received data at sample rate 80 Fn is up-converted to time-series data at sample rate 480 Fn.

Digital filter processor 65 (DF2) removes a high-frequency component included in the time-series data converted to a high sample rate. This high frequency cut-off filter provides attenuation necessary for a high-frequency region exceeding a frequency of ½ of the relay computation frequency. For example, when the relay computation period corresponds to electrical angle 30° of electrical quantity (relay computation frequency=12 f, where f is the system frequency), digital filter processor 65 (DF2) provides desired attenuation for a high-frequency region exceeding 6f. In the following description, the relay computation frequency is 12 f. However, the relay computation frequency is not limited thereto and may be 16 f (electrical angle 22.5°) or may be 24 f (electrical angle 15°).

Data storage 66 (DT1) stores time-series data after the filtering process by digital filter processor 65 (DF2) for the amount of time necessary for relay computation from the present time.

Down converter 67 (DOWNCONV) down-converts data stored in data storage 66 (DT1) with a sample rate of 480 Fn into time-series data having a relay computation frequency (for example, 12 f) by extracting data from data storage 66 (DT1) every number of data points corresponding to the relay computation period. Here, the data point at which sample time is extracted from data storage 66 (DT1) is adjusted in accordance with control signal 76 from synchronization processor 72.

Data storage 68 (DT2) stores current signal IQd (sample rate=12 f) on Q end down-converted by down converter 67 (DOWNCONV). Transmitting circuit 46 (TX) transmits current signal IQd (sample rate=12 f) on Q end to IED 40P on P end through digital transmission line 90.

Synchronization processor 72 calculates time difference Tr (see FIG. 16) between the transmission time of current signal IQd in transmitting circuit 46 (TX) and the reception time of current signal TPd in receiving circuit 45 (RX). Synchronization processor 72 then outputs control signal 76 to down converter 67 (DOWNCONV) such that transmission/reception time differences Ts and Tr are equal, based on the comparison result between transmission/reception time difference Ts (see FIG. 16) at the P end-side IED 40P received through receiving circuit 45 (RX) and the calculated transmission/reception time difference Tr.

Furthermore, synchronization processor 72 outputs current signal IPd (sample rate 12 f) on P end received through receiving circuit 45 (RX) as it is to differential relay computer 69A. This current signal IPd on P end lags behind by the transmission time of digital transmission line 90. Therefore, synchronization processor 72 generates current signal IQd_c by delaying current signal IQd (sample rate 12 f) on Q end stored in data storage 68 (DT2) by the transmission delay time (Td in FIG. 16) and outputs the generated current signal IQd_c to differential relay computer 69A. Here, when sample timing synchronization is achieved between P end and Q end, then Δt=0 in Equation (15) above, and thus transmission delay time Td is equal to transmission/reception time difference Ts in the P end-side IED 40P and transmission/reception time difference Tr in the Q end-side IED 40Q.

Differential relay computer 69A performs relay computation based on the P-end current signal IPd and the Q-end current signal IQd_c received from synchronization processor 72. As a result of relay computation, if it is determined that a failure occurs in power transmission line 1, relay computer 69 (RY) outputs a trip signal via digital output circuit 44 (D/O).

Computation processor 50 of master IED 40P on the P end side has a similar configuration as ordinary IED 40Q on the Q end side in FIG. 17. However, the operation of down converter 67 (DOWNCONV) and synchronization processor 72 differs between the P end-side IED 40P and the Q end-side IED 40Q.

Specifically, since the P end-side IED 40P transmits the P-end current signal IPd to Q end at its own timing, down converter 67 (DOWNCONV) does not adjust such that the sample time of a data point is matched with that on the other end when extracting data from data storage 66 (DT).

Synchronization processor 72 of the P end-side IED 40P generates current signal IPd_c by delaying current signal IPd (sample rate=12 f) on P end stored in data storage 68 (DT2) by the transmission delay time (Td in FIG. 16) and outputs the generated current signal IPd_c to differential relay computer 69A. Furthermore, synchronization processor 72 of the P end-side IED 40P outputs current signal IQd (sample rate 12 f) on Q end received through receiving circuit 45 (RX) as it is to differential relay computer 69A. Unlike the Q end-side IED 40Q, synchronization processor 72 of IED 40P does not output control signal 76 based on transmission/reception time differences Ts, Tr to down converter 67 (DOWNCONV).

Detail Operation of IED

Figure 18:
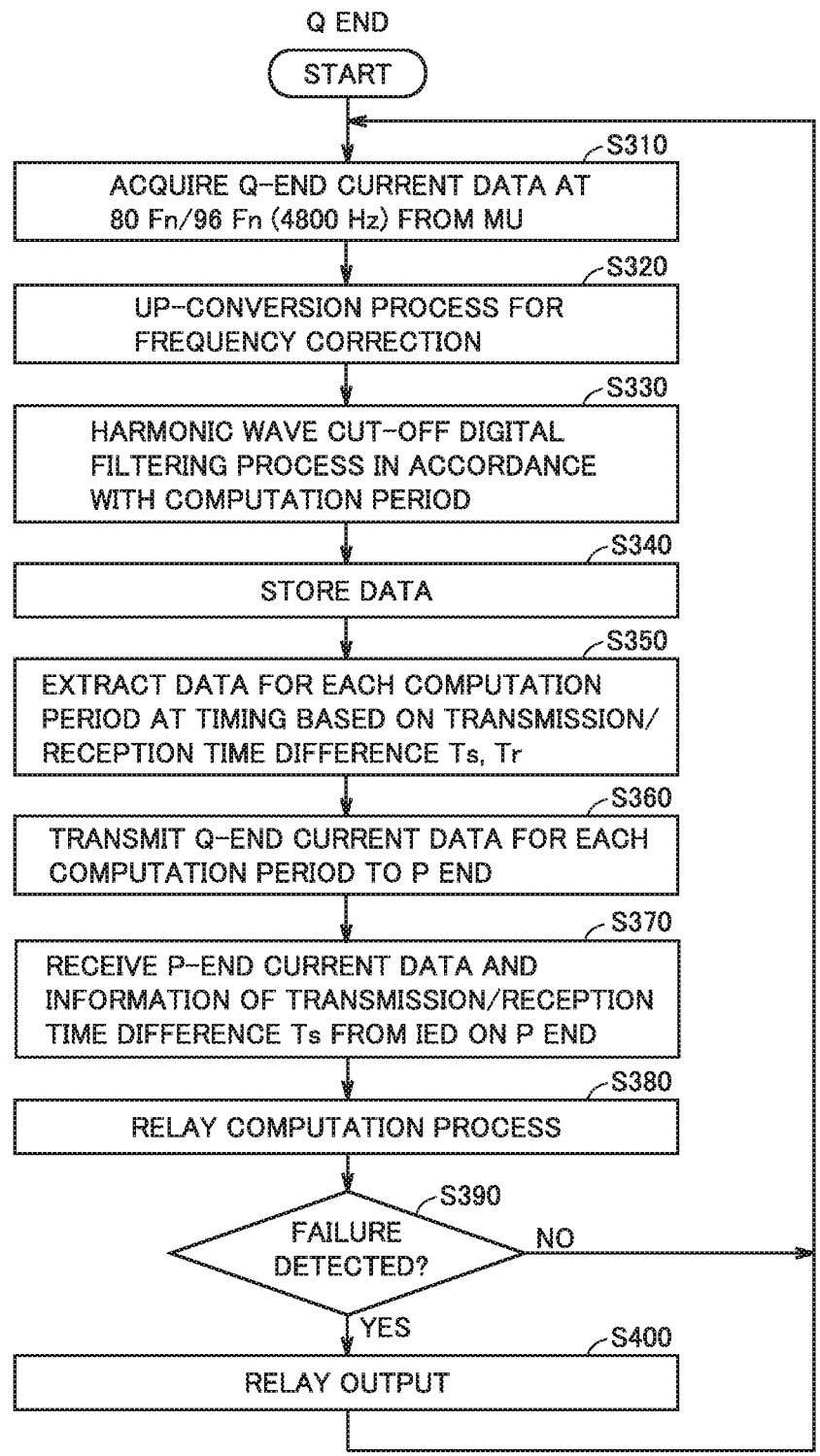
FIG. 18 is a flowchart showing the operation of the Q end-side IED in FIG. 17.

FIG. 18 is a flowchart showing the operation of the Q end-side IED in FIG. 17. The operation of IED 40Q on Q end, that is, the ordinary side is described in more detail mainly referring to FIG. 17 and FIG. 18.

First of all, in step S310 in FIG. 18, communication circuit 42 (TX/RX1) receives current data and voltage data sampled by MU 10Q in FIG. 15. The received sampling data is captured by computation processor 50. The sample frequency of current data and voltage data is, for example, 4800 Hz. When the rated frequency Fn is 50 Hz, 4800 Hz corresponds to 96 Fn. When the rated frequency Fn is 60 Hz, 4800 Hz corresponds to 80 Fn.

In step S320, up converter 64 (UPCONV) performs an up-conversion process of changing to a higher sample rate, using the data received in step S310. Assuming that the system frequency f is equal to the rated frequency Fn and the relay computation frequency is 12 f as in the first and second embodiments, the sample rate of data after up conversion is set to an integer multiple of the least common multiple (480 f) of 96f, 80 f, and 12 f.

In the next step S330, digital filter processor 65 (DF) performs a digital filtering process for the data up-converted to a sample rate of an integer multiple of 480 Fn. In order to configure an antialiasing filter for the down-conversion process (sampling at the relay computation frequency) to be executed in step S350 later, a low pass filter is configured so as to provide necessary attenuation for a frequency exceeding ½ of the relay computation frequency.

In the next step S340, data storage 66 (DT1) stores the latest data at a sample rate of an integer multiple of 480 Fn after the digital filtering process above by the amount of time required for relay computation (about three cycles).

In the next step S350, down converter 67 (DOWNCONV) down-converts the data with a sample rate of 480 Fn stored in data storage 66 (DT1) into time-series data having a relay computation frequency (for example, 12 f) by extracting data from data storage 66 (DT1) every number of data points corresponding to the relay computation period. For example, when the system frequency f is equal to the rated frequency Fn and data is extracted every electrical angle 30° of electrical quantity (relay computation frequency=12 f), one data is extracted every 40 data points (that is, 39 data points are decimated). This results in current signal IQd on Q end with sample rate 12 f.

In this down-conversion process, the data point of which sample data time is to be extracted from data storage 66 (DT1) is adjusted in accordance with control signal 76 from synchronization processor 72. Specifically, synchronization processor 72 outputs control signal 76 to down converter 67 (DOWNCONV) such that transmission/reception time differences Ts and Tr are equal to each other, based on the comparison result between transmission/reception time difference Ts (see FIG. 16) in the P end-side IED 40P received through receiving circuit 45 (RX) and the calculated transmission/reception time difference Tr. More specifically, when Ts>Tr, synchronization processor 72 instructs down converter 67 (DOWNCONV) to extract a data point at the time one sampling period earlier when extracting data from data storage 66 (DT1). When Ts<Tr, synchronization processor 72 instructs down converter 67 (DOWNCONV) to extract a data point at the time one sampling period later when extracting data from data storage 66 (DT1).

In the next step S360, transmitting circuit 46 (TX) transmits current signal IQd (sample rate=12 f) on Q end to IED 40P on P end through digital transmission line 90.

Concurrently with steps S310 to S360 above, in step S370, receiving circuit 45 (RX) receives current signal IPd (sample rate=12 f, where f is the system frequency) transmitted from the P end-side IED 40P through digital transmission line 90 and also receives information of transmission/reception time difference Ts (see FIG. 16) in the P end-side IED 40P. The information of transmission/reception time difference Ts is used in step S350 above.

In the next step S380, differential relay computer 69A performs relay computation based on the P-end current signal IPd received from synchronization processor 72 and the Q-end current signal IQd_c (the one delayed by transmission delay time Td). As a result of relay computation, if it is determined that a failure occurs in power transmission line 1 (YES in step S390), relay computer 69 (RY) outputs a trip signal via digital output circuit 44 (D/O) (step S400). If a failure is not detected by differential relay computer 69A, steps S310 to S380 above are repeated.

Figure 19B:
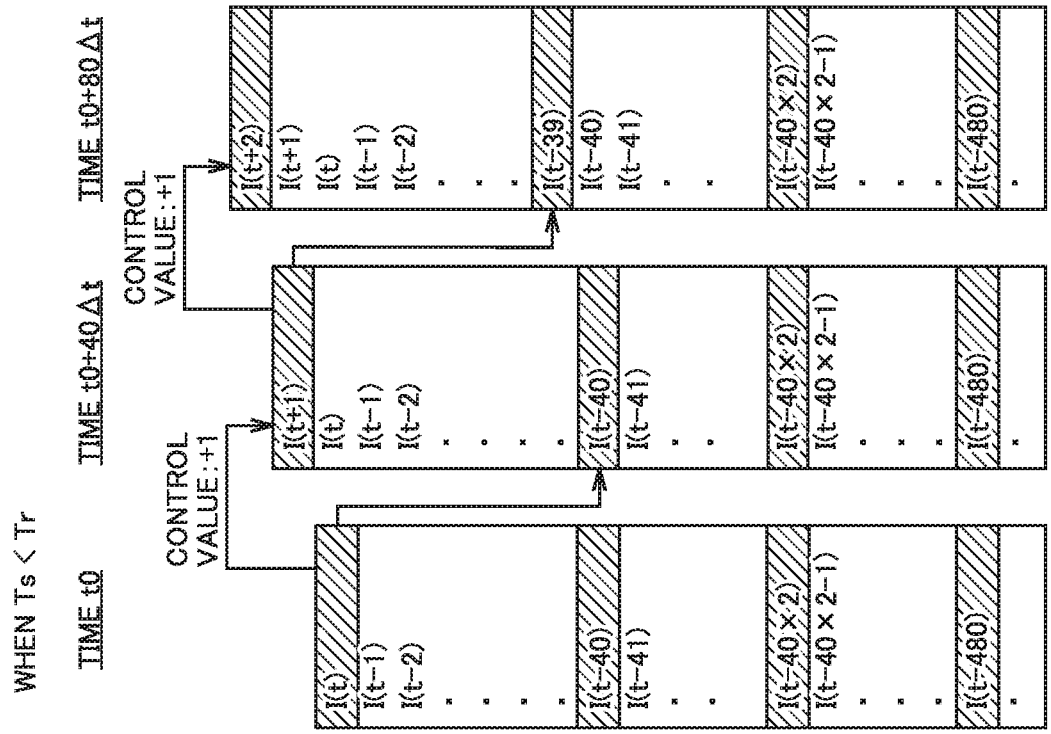
FIGS. 19A and 19B are illustrations of a down-conversion process in step S350 in FIG. 18.
Figure 19A:
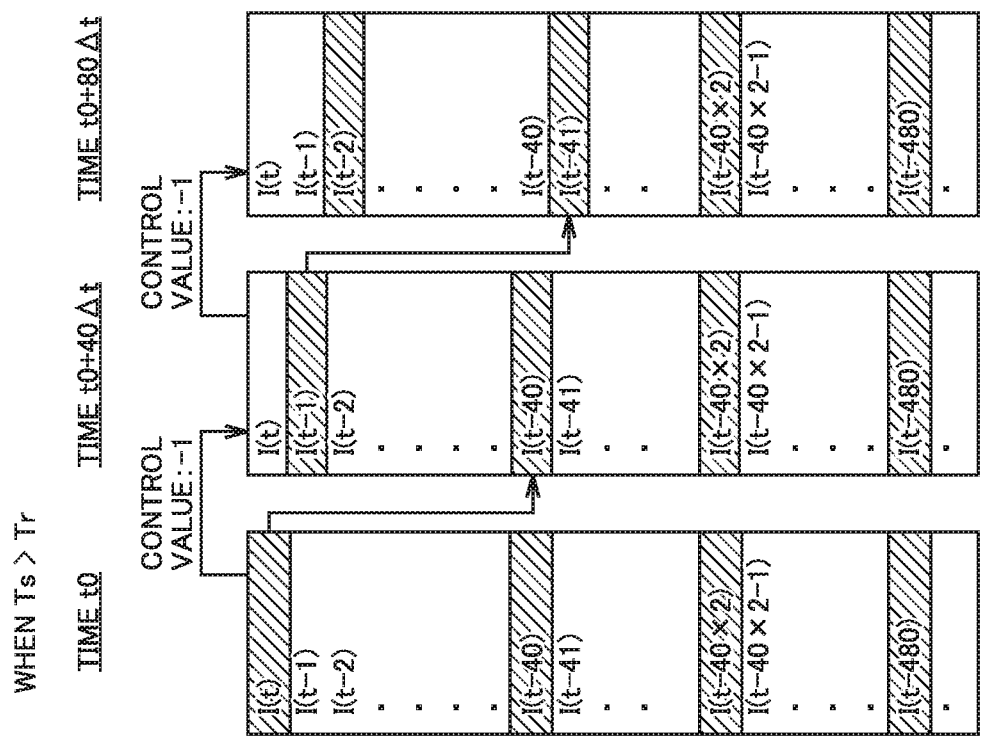

FIGS. 19A and 19B are illustrations of the down-conversion process in step S350 in FIG. 18. FIG. 19A shows the case where transmission/reception time difference Ts in the P end-side IED 40P is larger than transmission/reception time difference Tr in the Q end-side IED 40Q (Ts>Tr), and FIG. 19B shows the case where Ts<Tr. It is assumed that the system frequency f is equal to the rated frequency Fn=50 Hz and the sample rate of the received data from MU 40Q is 4800 Hz. It is further assumed that a sample rate of data after up conversion is 480 Fn (=480 f) and the relay computation frequency is 12 f. It is assumed that $\Delta t=1/(480\ f)$.

Referring to FIG. 19A, at time t=t0, time-series data at 480 Fn stored in data storage 66 (DT1) in FIG. 17 is denoted as I(t), I(t−1), I(t−2), . . . . The hatched data I(t), I(t−40), I(t−40×2), . . . in the figure is data extracted by down converter 67 (DOWNCONV). Sample value I(t) received at time t=t0 is transmitted to IED 40P on P end.

At time t=t0+40·Δt after the elapse of 40·Δt, the received sample value I(t) at time t0 corresponds to I(t−40). When Ts>Tr, −1 is output as control signal 76 from synchronization processor 72, and therefore, down converter 67 (DOWNCONV) extracts the sample value at I(t−1) before I(t) by Δt. The extracted sample value I(t−1) is transmitted to IED 40P on P end.

At time t=t0+80·Δt after the elapse of 40·Δt, the received sample value I(t−1) at time t=t0+39·Δt corresponds to I(t−41). When Ts>Tr, −1 is output as control signal 76 from synchronization processor 72, and therefore, down converter 67 (DOWNCONV) extracts the sample value at I(t−2) before I(t−1) by another Δt. The extracted sample value I(t−2) is transmitted to IED 40P on P end.

Referring to FIG. 19B, at time t=t0, time-series data at 480 Fn stored in data storage 66 (DT1) in FIG. 17 is denoted as I(t), I(t−1), I(t−2), . . . . The hatched data I(t), I(t−40), I(t−40×2), . . . in the figure is data extracted by down converter 67 (DOWNCONV). The received sample value I(t) at time t=t0 is transmitted to IED 40P on P end.

At time t=t0+40·Δt after the elapse of 40·Δt, the received sample value I(t) at time t=t0 corresponds to I(t−40). When Ts<Tr, +1 is output as control signal 76 from synchronization processor 72 and, therefore, down converter 67 (DOWNCONV) extracts the sample value at I(t+1) later than I(t) by Δt. The extracted sample value I(t+1) is transmitted to IED 40P on P end.

At time t=t0+80·Δt after the elapse of 40·Δt, the received sample value I(t+1) at time t=t0+41·Δt corresponds to I(t−39). When Ts<Tr, +1 is output as control signal 76 from synchronization processor 72 and, therefore, down converter 67 (DOWNCONV) extracts the sample value at I(t+2) later than 1(t+1) by another Δt.

The extracted sample value I(t−2) is transmitted to IED 40P on P end.

Effects

As described above, in the IED in the third embodiment, sampling synchronization on both ends of the power transmission line can be achieved without a synchronizing signal from the IED to the MU. In the example above, the up conversion is 480 Fn. However, its integer multiple may be used for an even higher sample rate, thereby achieving higher sampling synchronization accuracy.

In the foregoing description, the system frequency f is equal to the rated frequency Fn. However, even when the system frequency f is different from the rated frequency Fn, the sampling synchronization on both ends of the power transmission line can be achieved by the method above. In this case, as described in the first and second embodiments, computation processors 50 of the IEDs on the P end side and the Q end side further include digital filter processor 60 (DF1), frequency computer 61 (FCALC), and sample timing controller 62 (ST). In this case, when down converter 67 (DOWNCONV) extracts data from data storage 66 (DT1), the number of data points corresponding to the relay computation period (the number of data points to be decimated) is adjusted based on the system frequency f at present.

Alternatively, synchronization processor 72 may serve the function of sample timing controller 62 (ST). In this case, the computation result of system frequency by frequency computer 61 (FCALC) is input to synchronization processor 72. Synchronization processor 72 outputs control signal 76 (timing signal in the modification to the first embodiment) to down converter 67 (DOWNCONV), based on transmission/reception time differences Ts, Tr and the value of system frequency.

Modifications to First to Third Embodiments

In the foregoing first to third embodiments, computation processor 50 is configured based on a microcomputer including a CPU, a RAM, and a ROM. Instead, computation processor 50 may be configured with a circuit such as ASIC (Application Specific Integrated Circuit) or FPGA (Field-Programmable Gate Array).

In the foregoing first to third embodiments, the conventional protective relay is functionally divided into a MU and an IED. However, the function of IED is not limited thereto. For example, the LED may include a control function of the electric power system, in addition to protective relay computation.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

1 three-phase line (power transmission line), 2, 2P, 2Q current transformer, 3 voltage transformer, 4 breaker, 6, 6P, 6Q process bus (communication line), 11 input converter, 12 input converter, 15 A/D converter, 16 analog filter, 17 sample and hold circuit, 18 multiplexer, 19 A/D converter, 31 communication circuit, 50 computation processor, 51 CPU, 41 interface, 42 communication circuit (TX/RX1), 43 transmitting/receiving circuit (TX/RX2), 44 digital output circuit (D/O), 45 receiving circuit (RX), 46 transmitting circuit (TX), 60 digital filter processor (DF1), 61 frequency computer (FCALC), 62 sample timing controller (ST), 64 up converter (UPCONV), 65 digital filter processor (DF2), 66 data storage (DT1), 67 down converter (DOWNCONV), 68 data storage (DT2), 69 relay computer (RY), 69A differential relay computer (RY), 70 data storage (DT3), 71 counter, 72 synchronization processor, 75 control signal (FIG. 3, FIG. 11), 76 control signal (FIG. 17), 90 digital transmission line, Fn rated frequency, Id digital current signal, IPd P end-side digital current signal, IQd Q end-side digital current signal, TS trip signal, Td transmission delay time, Tr transmission/reception time difference (Q end-side IED), Ts transmission/reception time difference (P end-side IED).

The invention claimed is:
1. An intelligent electronic device comprising:
a communication circuit configured to receive first time-series data at a first sample rate representing electrical quantity of an electric power system from a merging unit;
an up converter configured to convert the first time-series data into second time-series data having a second sample rate higher than the first sample rate by interpolating the first time-series data;
a down converter configured to convert the second time-series data into third time-series data having a third sample rate lower than the first sample rate by periodically extracting a data point at any changeable sample time from the second time-series data; and
a relay computer configured to perform protective relay computation using the third time-series data.
2. The intelligent electronic device according to claim 1, wherein the down converter extracts partial data from the second time-series data every determined number of data points based on the first time-series data.
3. The intelligent electronic device according to claim 2, further comprising a frequency computer configured to calculate a system frequency at present of the electric power system, based on the first time-series data,
wherein the determined number of data points is adjusted in accordance with the system frequency.
4. The intelligent electronic device according to claim 3, wherein
the determined number of data points is smaller as the calculated value of the system frequency is greater than a rated frequency and is larger as the calculated value of the system frequency is smaller than the rated frequency.
5. The intelligent electronic device according to claim 2, wherein
the intelligent electronic device is disposed on a first end of a power transmission line,
the intelligent electronic device further comprises a transmitting circuit and a receiving circuit for communicating with another intelligent electronic device disposed on a second end of the power transmission line, and
the down converter changes a data point to be extracted from the second time-series data, based on information received from the other intelligent electronic device through the receiving circuit, together with information of the first time-series data.
6. The intelligent electronic device according to claim 1, further comprising a timing signal generator configured to generate a timing signal based on the first time-series data,
wherein the down converter extracts partial data from the second time-series data at a timing in accordance with the timing signal.
7. The intelligent electronic device according to claim 6, further comprising a frequency computer configured to calculate a system frequency at present of the electric power system, based on the first time-series data,
wherein the timing signal generator adjusts a period of the timing signal in accordance with the system frequency.
8. The intelligent electronic device according to claim 7, wherein the period of the timing signal is smaller as the calculated valued of the system frequency is greater than a rated frequency and is larger as the calculated value of the system frequency is smaller than the rated frequency.
9. The intelligent electronic device according to claim 6, wherein
the intelligent electronic device is disposed on a first end of a power transmission line, the intelligent electronic device further comprises a transmitting circuit and a receiving circuit for communicating with another intelligent electronic device disposed on a second end of the power transmission line, and the timing signal generator generates the timing signal, based on information received from the other intelligent electronic device through the receiving circuit, together with information of the first time-series data.

10. The intelligent electronic device according to claim 1, wherein the intelligent electronic device further comprises:

a first data storage and a second data storage configured to store the second time-series data up to a predetermined time before present time while successively updating the second time-series data; and a counter, wherein when a failure is detected in the electric power system by the relay computer, the first data storage continues updating, the second data storage stops updating, and the counter starts counting, the down converter converts data stored in each of the first and second data storages into the third time-series data having the third sample rate, the intelligent electronic device further comprises a third data storage, and the third data storage stores the third time-series data and stores a value of the counter.

11. The intelligent electronic device according to claim 1, wherein the intelligent electronic device is disposed on a first end of a power transmission line, the intelligent electronic device further comprises:

a transmitting circuit for transmitting a first synchronizing signal and the third time-series data to another intelligent electronic device disposed at a second end of the power transmission line through a digital transmission line, as a current signal on the first end; and a receiving circuit for receiving a current signal on the second end transmitted from the other intelligent electronic device through the digital transmission line and a second synchronizing signal, the receiving circuit further receives information of a first transmission/reception time difference from the other intelligent electronic device, the first transmission/reception time difference being a time difference from when the other intelligent electronic device transmits the second synchronizing signal to when the other intelligent electronic device receives the first synchronizing signal, the intelligent electronic device further comprises a synchronization processor, the synchronization processor calculates a second transmission/reception time difference, the second transmission/reception time difference being a time difference from when the first synchronizing signal is transmitted to when the second synchronizing signal is received, and when generating the third time-series data, the down converter extracts a data point at a sample time that varies depending on a comparison result between the first and second transmission/reception time differences, from the second time-series data.

12. The intelligent electronic device according to claim 11, wherein when the first transmission/reception time difference is greater than the second transmission/reception time difference, the down converter extracts a data point at an earlier sample time from the second time-series data, in generating the third time-series data, or when the first transmission/reception time difference is smaller than the second transmission/reception time difference, the down converter extracts a data point at a later sample time from the second time-series data, in generating the third time-series data.

13. The intelligent electronic device according to claim 1, wherein the second sample rate is equal to a least common multiple of the first sample rate and the third sample rate or equal to the least common multiple multiplied by an integer.

14. The intelligent electronic device according to claim 1, wherein the intelligent electronic device is applicable to both a first rated frequency and a second rated frequency different from each other as a rated frequency of the electric power system, the first sample rate is equal to a first integer multiple of the first rated frequency and equal to a second integer multiple of the second rated frequency, and the second sample rate is equal to a least common multiple of the first integer, the second integer, and the third sample rate or equal to the least common multiple multiplied by an integer.

\* \* \* \* \*